United States Patent [19]

Haruna et al.

[11] Patent Number: 4,644,480

[45] Date of Patent: Feb. 17, 1987

[54] RELIABILITY ANALYZING SYSTEM FOR MANUFACTURING PROCESSES

[75] Inventors: Koichi Haruna, Yokohama; Kazuo Nakao, Sagamihara; Tamotsu Nishiyama, Inashiro; Tsutomu Tashiro, Sagamihara; Kuniaki Matsumoto, Tokyo; Nobuyuki Saida, Yokohama, all of Japan

[73] Assignees: Hitachi, Ltd.; Hitachi Microcomputer Engineering, Ltd., both of Tokyo, Japan

[21] Appl. No.: 672,210

[22] Filed: Nov. 16, 1984

[30] Foreign Application Priority Data

Nov. 18, 1983 [JP] Japan .................................. 58-217130

[51] Int. Cl.[4] ............................................. G06F 15/46
[52] U.S. Cl. ..................................... 364/552; 364/300
[58] Field of Search ........................ 364/552, 300, 551

[56] References Cited

U.S. PATENT DOCUMENTS 3,946,212  3/1976  Nakao et al. ......................... 364/552

FOREIGN PATENT DOCUMENTS 2360132  3/1978  France ................................. 364/552
0714362  10/1980  U.S.S.R. ............................. 364/552

Primary Examiner—Edward J. Wise
Attorney, Agent, or Firm—Antonelli, Terry & Wands

[57] ABSTRACT

A reliability analyzing system for manufacturing processes is disclosed, which comprises a computer system provided with a data memory device, a central processing device and input/output devices, terminals which input/output information into/from said computer system, and output devices for manufacturing sites; whereby said data memory device stores required specifications for each product, works for manufacturing and controlling processes, information relating to items, such as required specifications, works, control items, etc. and information mutually relating different items, and on the basis of the stored information, reliability analysis for each process is effected for all the processes and reliability analysis for each required specification is performed for all the required specifications.

8 Claims, 28 Drawing Figures

FIG. 6

| ITEM ID | ITEM CONTENT | ATTRIBUTE | |
|---|---|---|---|
| ITEM ID | ITEM CONTENT | ATTRIBUTE | 111a |
| ITEM ID | ITEM CONTENT | ATTRIBUTE | 111b |
| ITEM ID | ITEM CONTENT | ATTRIBUTE | 111c |
| ITEM ID | ITEM CONTENT | ATTRIBUTE | 111d |
| ITEM ID | ITEM CONTENT | ATTRIBUTE | 111e |
| ITEM ID | ITEM CONTENT | ATTRIBUTE | 111f |
| ITEM ID | ITEM CONTENT | ATTRIBUTE | 111g |

| | | | | |
|---|---|---|---|---|
| 131a | ITEM ID OF $e_1$ | • | ITEM ID OF $e_3$ | • |
| 131b | ITEM ID OF $e_1$ | • | ITEM ID OF $e_4$ | • |
| 131c | ITEM ID OF $e_1$ | • | ITEM ID OF $e_2$ | • |
| 131d | ITEM ID OF $e_1$ | • | ITEM ID OF $e_5$ | • |
| 131e | ITEM ID OF $e_2$ | • | ITEM ID OF $e_3$ | • |
| 131f | ITEM ID OF $e_2$ | • | ITEM ID OF $e_4$ | • |
| 131g | ITEM ID OF $e_2$ | • | ITEM ID OF $e_6$ | • |
| 131h | ITEM ID OF $e_3$ | • | ITEM ID OF $e_4$ | • |

130, 132, 133

FIG. 8
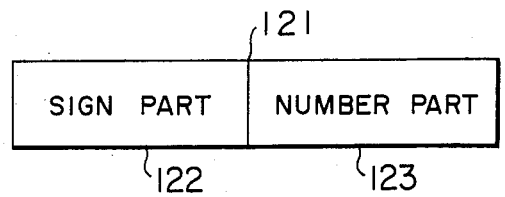
FIG. 9
| i | | |
|---|---|---|
| 1 | Q | 0 |
| 2 | F | 0 |
| 3 | M | 0 |
| 4 | A | 1 |
| 5 | P | 1 |
141    142
FIG. 14
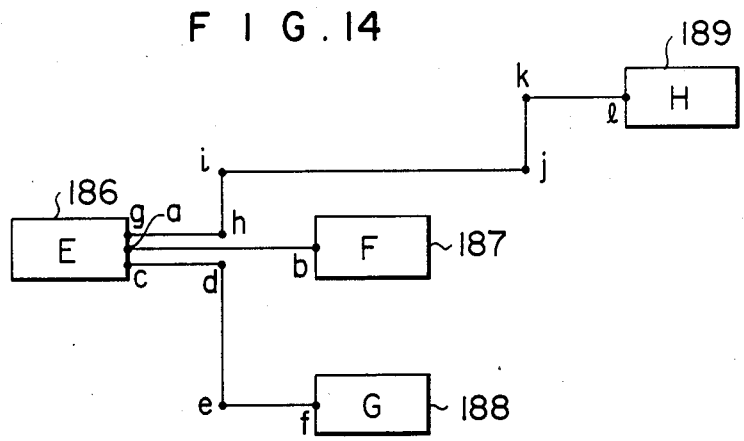

FIG. 11
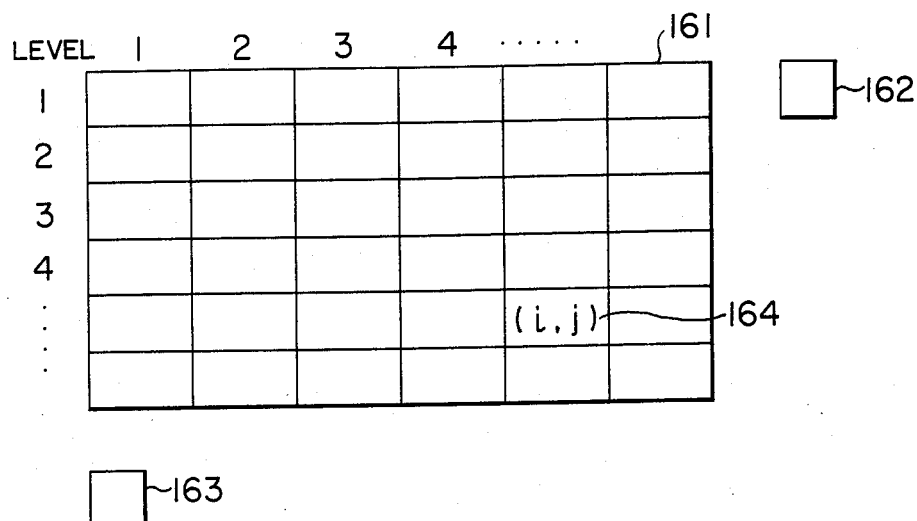
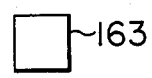
FIG. 12
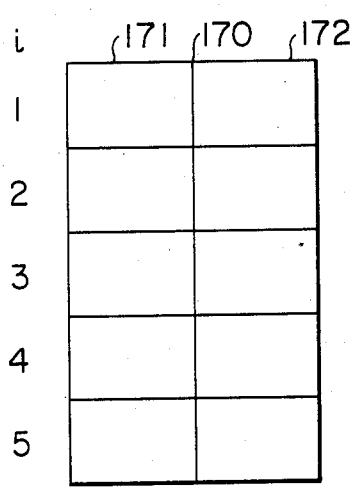

FIG. 13

| | 183 | 184a | 184b | 184c | 184d | 184e | 184f | 185 |
|182|...|...|...|...|...|...|...|...|
| | | | | | | | | 181a |
| | | | | | | | | 181b |
| | | | | | | | | 181c |
| ... | ... | ... | ... | ... | ... | ... | ... | ... |
| ITEM NUMBER OF E | ITEM NUMBER OF F | COORDI-NATES OF a | COORDI-NATES OF b | O | | | | ATTRIBUTE |
| ITEM NUMBER OF E | ITEM NUMBER OF G | COORDI-NATES OF c | COORDI-NATES OF d | COORDI-NATES OF e | COORDI-NATES OF f | O | O | ATTRIBUTE |
| ITEM NUMBER OF E | ITEM NUMBER OF H | COORDI-NATES OF g | COORDI-NATES OF h | COORDI-NATES OF i | COORDI-NATES OF j | COORDI-NATES OF k | COORDI-NATES OF l | ATTRIBUTE |
| ... | ... | ... | ... | ... | ... | ... | ... | ... |

180

F I G. 16

QUALITY BUILD-IN WORK
INSTRUCTION MANUAL (APC)

| | MANUFACTURING DEPARTMENT | CONTROL DEPARTMENT |
|---|---|---|
| 197a | 197b | 197c |

| PROCEDURE | YOUR WORK | CONTENT TO BE CONTROLLED | RELATION WITH REQUIRED QUALITY TO BE CONTROLLED | REMARKS |
|---|---|---|---|---|
| | | | | |
| | | | | |
| | | | | |
| | | | | |
| | | | | |
| | | | | |
| | | | | |
| | | | | |

198a, 198b, 198c, 198d, 198e

"QUALITY OF HITACHI WHICH YOU MAKE"

FIG. 17

| | INTERCEPT DOMAIN | DIRECTION | | |
|---|---|---|---|---|
| | | DIRECTION TOWARD LOWER RANK | DIRECTION TOWARD HIGHER RANK | BOTH DIRECTIONS |
| DOMAIN SPECIFICATION BY LAYER | Q – P (WHOLE DOMAIN) | REQUIRED QUALITY GUARANTY SCHEME | INFLUENCE SCHEME FOR DEFECTIVE WORK | |
| | Q – A | | | |
| | Q – M | | | |
| | Q – F | | | |
| | Q | TREE OF REQUIRED QUALITIES | | |
| | F – P | | | |
| | F – A | | | |
| | F – M | | | |
| | F | | | |
| | M – P | | | |
| | M – A | | | |
| | M | | | |
| | A – P | | | |
| | A | | | |
| | P | | | |
| DOMAIN SPECIFICATION BY LEVEL | 1 | | | |
| | 2 | | | |
| | 3 | | | |
| | ⋮ | ⋮ | ⋮ | ⋮ |

FIG. 18A
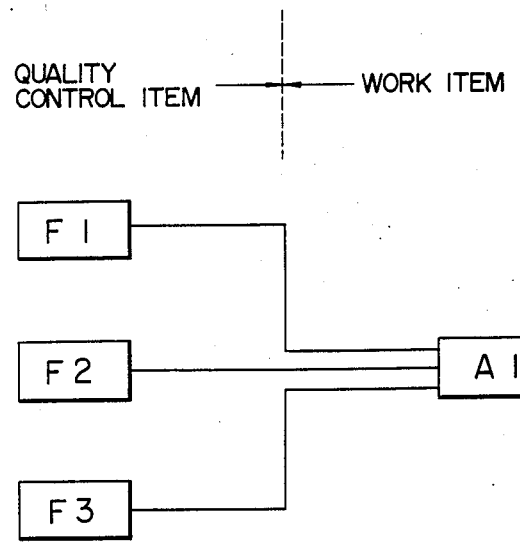
FIG. 18B
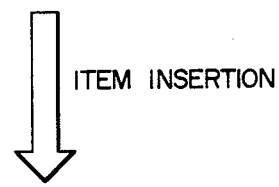
ITEM INSERTION
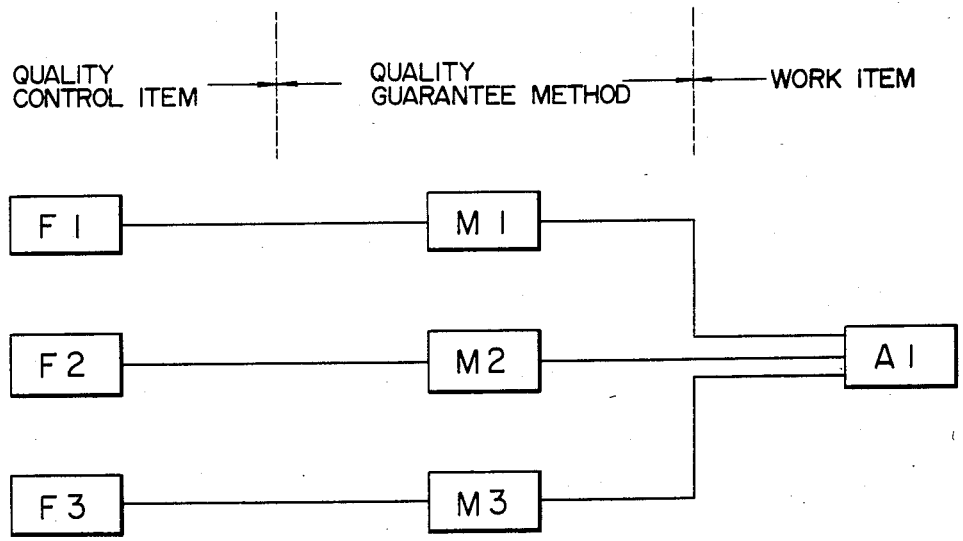

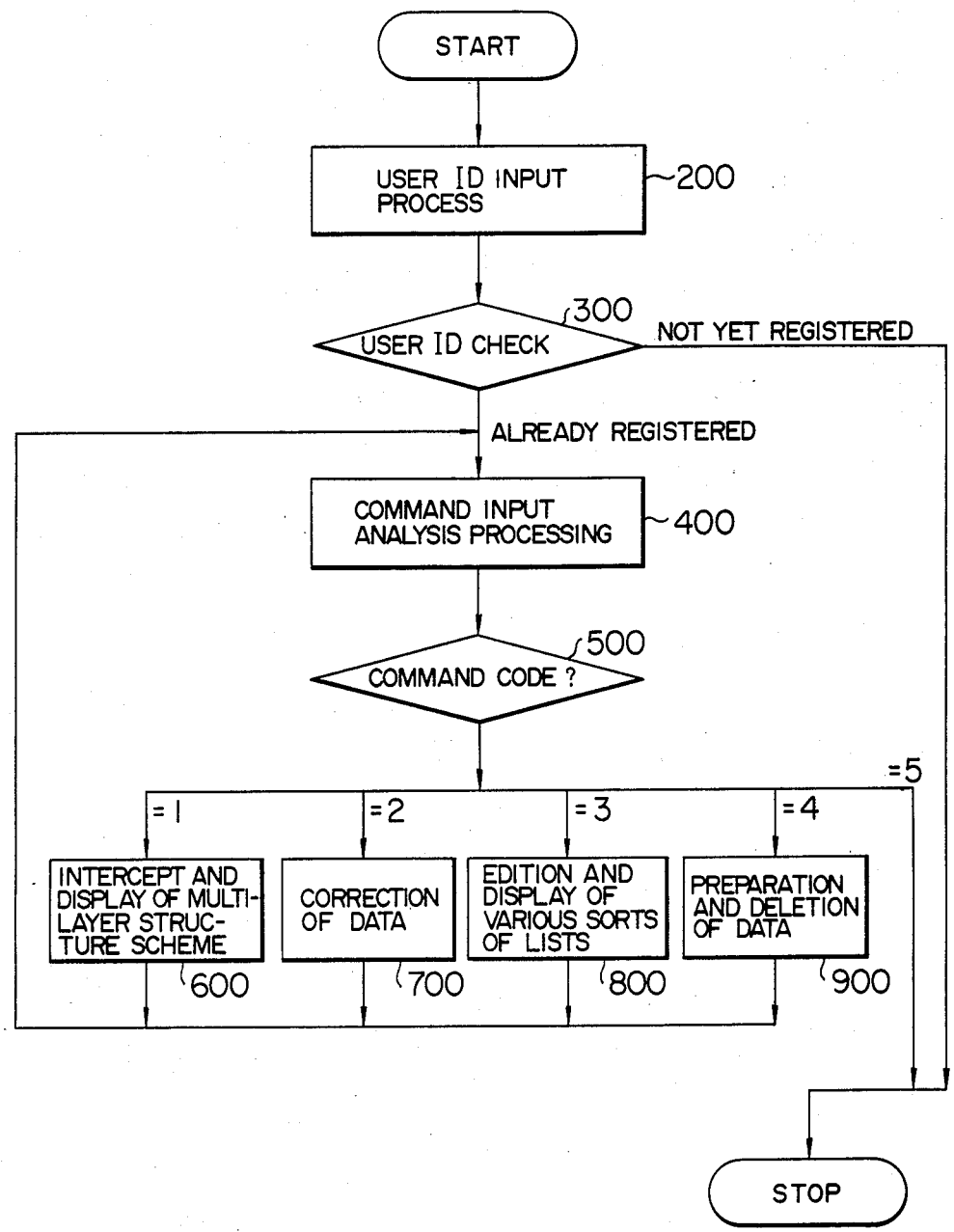

F I G . 24
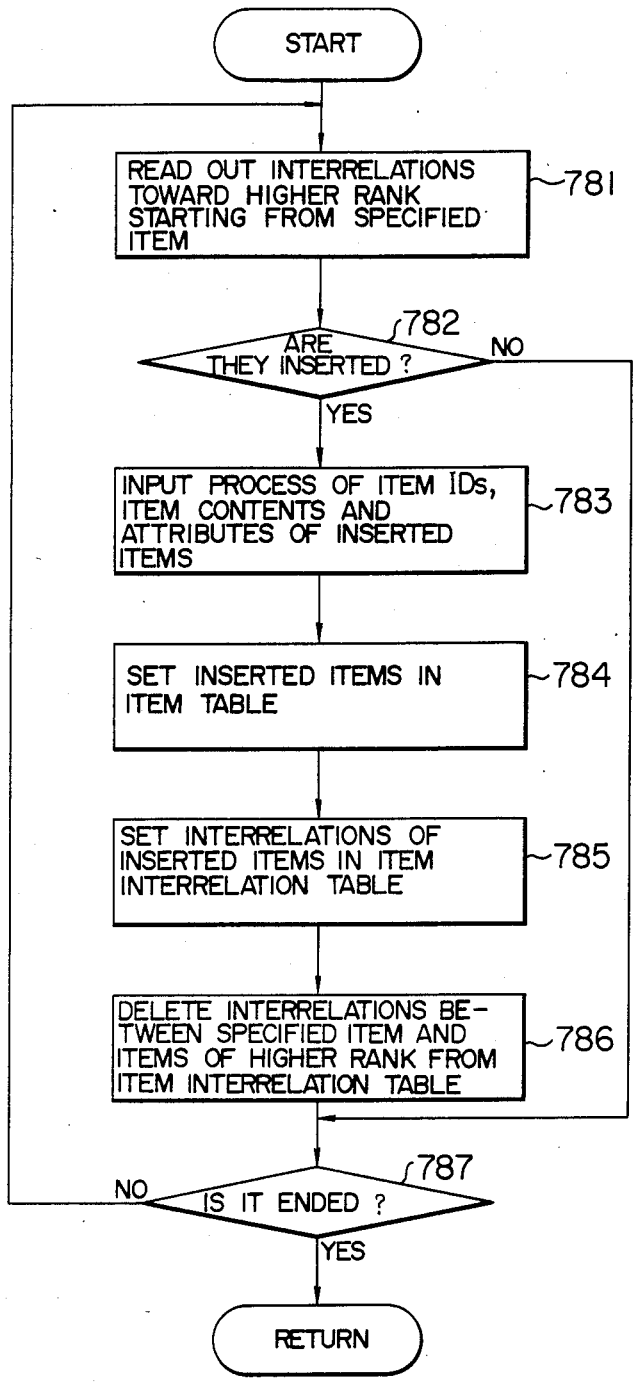

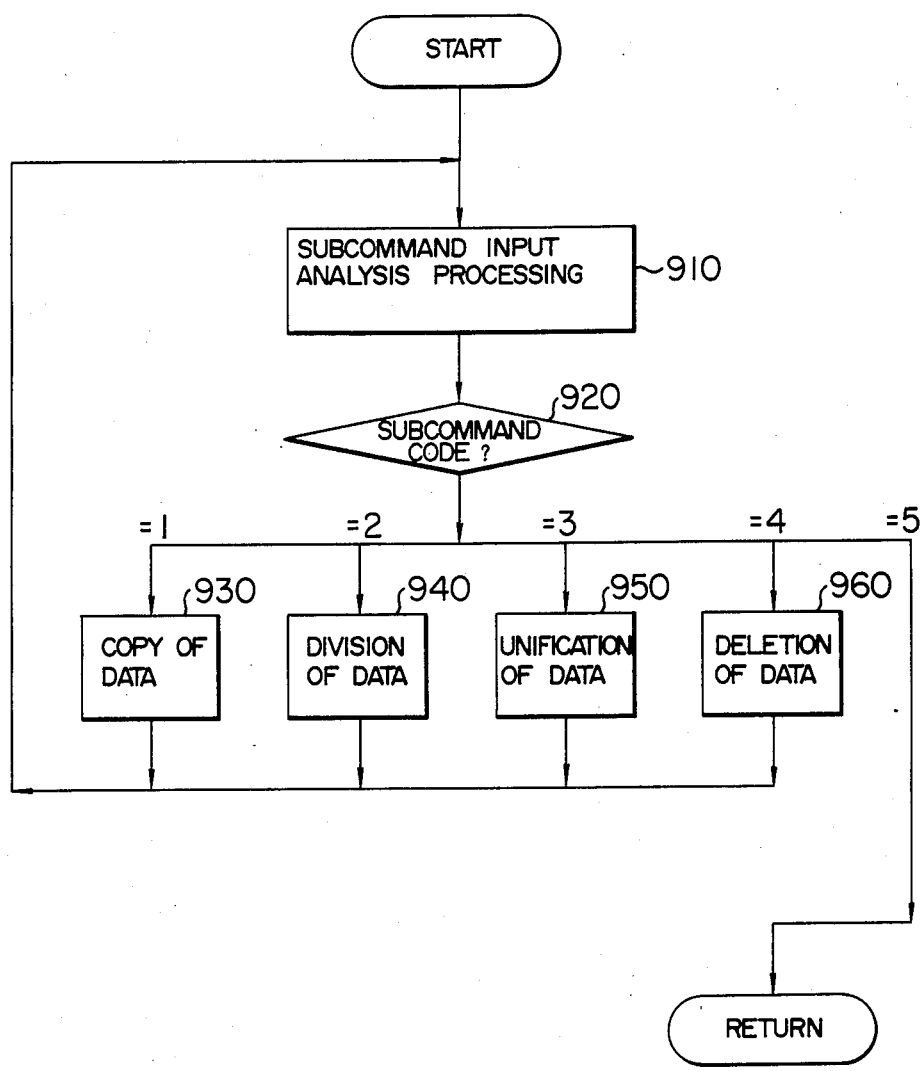

RELIABILITY ANALYZING SYSTEM FOR MANUFACTURING PROCESSES

BACKGROUND OF THE INVENTION

1. Field of the Invention

This invention relates to a reliability analyzing system for manufacturing processes, in particular to a reliability analyzing system for manufacturing processes permitting to analyze the reliability of manufacturing and controlling processes and to effect the quality control of manufacturing and controlling processes in view of securing specifications i.e. quality required to products with respect to manufacturing and controlling processes therefor.

2. Description of the Prior Art

Hitherto, as reliability analyzing methods for manufacturing processes, are known "Process FMEA" (cf. e.g. Ford: RELIABILITY METHODS, Failure Mode and Effects Analysis for Processes-Module XIV-A, RELIABILITY OFFICE, NORTH AMERICAN AUTOMOTIVE OPERATIONS, January (1972), which is a method developed for reliability analysis of manufacturing processes on the basis of the FMEA (Failure Mode and Effects Analysis) method utilized for reliability analysis for machinery and tools or systems, and Shimakura and Haneda: QEC activities for IC production, "Hinshitsu" (Quality), Vol. 10, No. 3, pp. 135-203 (1980)).

"Process FMEA" is a method by which defective modes (failure modes) expected to appear during each process are enumerated; the causes giving rise to the defective modes and their influences on products are extracted; and the contents are described in the form of a list for every defective mode of a process. However, since the method is based on descriptions in the form of a list, its descriptive capacity is low and its utilization is limited to analysis of separate defective modes. Consequently, it is not suitable to analyze the reliability of manufacturing and controlling processes as a whole. That is, by "Process FMEA", influences of the defective modes and the causes of their occurrence are described separately for each of the defective modes, and the relation between each of the defective modes and the quality required to the product are not treated in a clear manner. As a result, it has drawbacks that influences on the products provoked by a plurality of defective modes are not clear and further latent defective phenomena are overlooked, etc. Moreover "Process FMEA" is unsuitable for the reliability analysis concerning the positive aspects of the quality, such as increase of the process capacity, shortening of the process, quality guarantee by process changes, etc., because inter-relationships between different processes are not clear.

SUMMARY OF THE INVENTION

In view of removing these drawbacks of the prior art system described above and excluding deficiencies in the manufacturing and controlling processes for products, an object of this invention is to provide a reliability analyzing system for manufacturing processes permitting to analyze and confirm whether the required specifications are satisfactorily fulfilled in manufacturing and inspecting processes and to effect quality control of the manufacturing processes on the basis of analysis results thus obtained.

In order to achieve this object, a reliability analyzing system for manufacturing processes according to this invention is characterized in that it comprises a computer system provided with a data memory device, a central processing device and input/output devices, terminals which input/output information into/from said computer system, and output devices for manufacturing sites, whereby said data memory device stores required specifications for each product, works for manufacturing and inspecting processes, information relating to items, such as required specifications, works, control items, etc. and information mutually relating different items, works, control items for said works, and required specifications relating to said control items are extracted for each process from information thus stored; schemes are formed on the basis of this extracted information and outputted to an output device, such as a display device; said schemes are analyzed; in the case where said schemes should be corrected, correction and replacement of each item and mutual relation of said stored information from said terminals are effected an arbitrary number of times; works which influence said required specifications and the control items for said works are extracted; schemes are formed on the basis of this extracted information and outputted to an output device, such as a display device; said schemes are analyzed; in the case where said schemes should be corrected, correction and replacement of each item and mutual relation of said stored information; and in this manner reliability is analyzed for each process and required specification.

BRIEF DESCRIPTION OF THE DRAWINGS

FIG. 6 is a construction scheme of an item table used for this invention.

FIG. 7 is a construction scheme showing an example of item interrelation tables used for this invention.

FIG. 8 is a construction scheme of an item sequence table for the 2 items, work (A) and process (P), used for this invention.

FIG. 9 is a construction scheme of a correspondence table indicating the relation between the sort of items and the sequential number of layers used for this invention.

FIG. 11 is a construction scheme of an item arrangement table used for this invention.

FIG. 12 is a construction scheme of a level-layer correspondence table used for this invention.

FIG. 13 is a construction scheme of an interrelation line table used for this invention.

FIG. 14 is a diagram for explaining the interrelation lines in FIG. 13.

FIG. 16 is a scheme showing an example of work instruction manuals used for this invention.

FIG. 17 is a scheme showing combinations of the direction and the domain of intercept used for this invention.

FIGS. 18A and 18B are schemes showing examples of insertion by means of an INSERT subcommand.

FIG. 20 is a flow chart of the whole process of a conversation type support system according to this invention.

FIG. 24 is a flow chart of the item insertion process in FIG. 23.

FIG. 26 is a flow chart of the data preparation and deletion process in FIG. 20.

DESCRIPTION OF THE PREFERRED EMBODIMENTS

Figure 1:
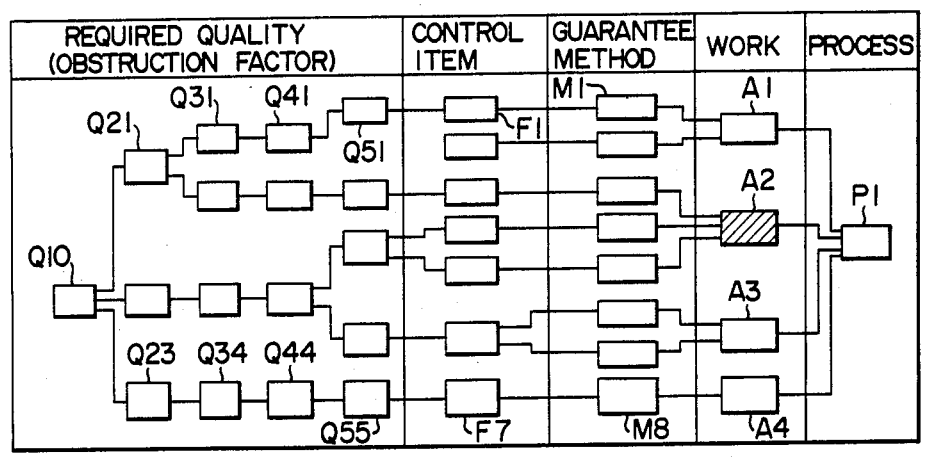
FIG. 1 is a diagram showing an example of influence schemes for a defective work used for this invention.

Hereinbelow an embodiment of this invention will be explained, referring to the drawings.

Figure 2:
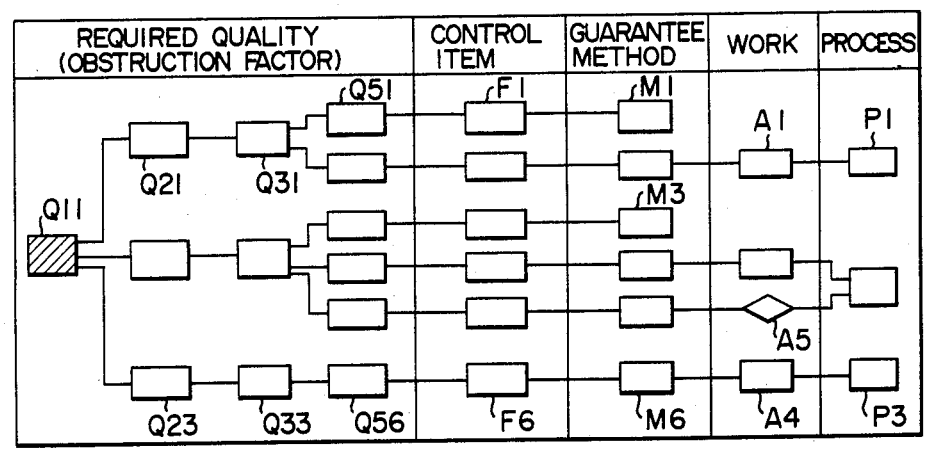
FIG. 2 is a diagram showing an example of guarantee schemes for a required quality used for this invention.

FIG. 1 is a diagram showing an example of influence schemes for a defective work used for this invention and FIG. 2 is a diagram showing an example of guarantee schemes for a required quality used for this invention.

Both in FIGS. 1 and 2, in the horizontal direction, a plurality of layers are formed in the order of required quality (obstruction factor), control item, guarantee method, work, and process, and in the vertical direction is arranged the order of works in the process.

FIGS. 1 and 2 show a same format, but different contents. FIG. 1 is a diagram, where a defective work at work A2, hatched in the figure, has influences on the side of the required quality, and on the other hand FIG. 2 is a diagram, where what sort of works should be done and how it should be done as well as for the control, to what attention should be payed, so that a required quality Q11, hatched in the figure, is guaranteed, are analyzed. (A5 indicates a control work which is to be done.) In this case the required specification is one of the specifications required by users, e.g. for video devices a good quality of sound and image, etc. Obstruction factors Q51-Q56 are e.g. where a loosened screw is, etc.; control items F1-F7 are e.g. to fasten a screw, etc.; guarantee method M1-M8 are e.g. jigs and methods for fastening screws; works A1-A4 are works for each worker, etc., e.g. works for fastening screws, etc.; and processes P1-P3 represent assemblies and flows of the works for each workers.

In FIG. 1, attention is payed to deficiencies which can appear in each of the processes or works; causal sequences, on what required qualities the deficiencies have influences, are analyzed; and necessary control items or guarantee methods are set up in order that the required qualities may be satisfactorily guaranteed in the works.

In FIG. 2, whether the controls necessary for a certain required quality are carried out, whether works relating to the required quality are not done after the termination of the controls, etc. are analyzed, and drawbacks in the design and the processes are extracted. Usually designers of a product design the product, taking the required qualities into account, but production engineers and process designers for manufacture and control are subject to forget the required qualities, because they design the production process, considering often only how the product is produced just as designed with a high efficiency.

According to this invention, the specifications required to the product and the contents of works in the production process are compared with each other and reliability of the quality guarantee for the manufacturing and inspecting processes is analyzed by checking whether the required specifications are satisfactorily secured by the manufacturing and controlling processes. Analysis results thus obtained are reflected immediately in the manufacturing and inspecting processes. Between the required specifications and the manufacturing processes exists very complicated relation as a whole, whose number of items is 50-2000. According to this invention, as indicated in FIGS. 1 and 2, only the items for each process or those relating to each required quality are extracted and displayed as a multi-layer structure scheme. In this way, the mutual relations between the required specifications and the manufacturing processes are clarified in a visually easily comprehensible form and individual fragmental knowledges thus extracted are integrated in a system, permitting thus to analyze the whole system.

Next a method used for the reliability analyzing system for the manufacturing and inspecting processes will be described in a concrete sequence.

(i) The required specifications (required qualities) for a product and works in the manufacturing processes are interrelated through obstruction factors and control items and the whole data are inputted in a data file so that they can be controlled in a unified manner.

(ii) Specifying a certain direction or domain in the noticed items, such as individual processes, required qualities, etc., the related items in the domain are arranged for each of the items of different conception, such as required qualities, obstruction factors, control items, works, etc. and stored in a table of intercept items.

(iii) The items stored in said table of intercept items are divided into a plurality of layers for each of items of different conception are arranged in the order of required quality, obstruction factor, control item and work in one direction and in the order of the work flow in the direction which is perpendicular to the former. A multi-layer structure scheme (cf. FIGS. 1 and 2) is formed by connecting mutually related items among them, which scheme is then outputted.

(iv) A multi-layer structure scheme (FIG. 1) consisting of items intercepted for each of the processes is outputted and reliability analysis for each of the processes is carried out by using this scheme. In the case where the scheme should be corrected, the necessary corrections concerning items or interrelations therebetween are inputted. The contents of the data file are thus renewed and a multi-layer structure scheme is again outputted, basing on the contents of the renewed data file. This procedure is repeated a necessary number of times.

(v) The multi-layer structure scheme (FIG. 2) consisting of items intercepted for each of the required qualities is outputted and total reliability analysis for the processes is carried out by using the scheme and noticing a specified required quality. In the case where the scheme should be corrected, the necessary corrections concerning items or interrelations therebetween are inputted. The contents of the data file are thus renewed and a multi-layer structure scheme is again outputted, basing on the contents of the renewed data file. This procedure is repeated a necessary number of times.

(vi) Work instructions are given to the manufacturing processes, basing on the contents of the data file. Moreover, the work sequence of the manufacturing and controlling processes is modified every day and work instructions are given to the manufacturing processes.

Figure 3:
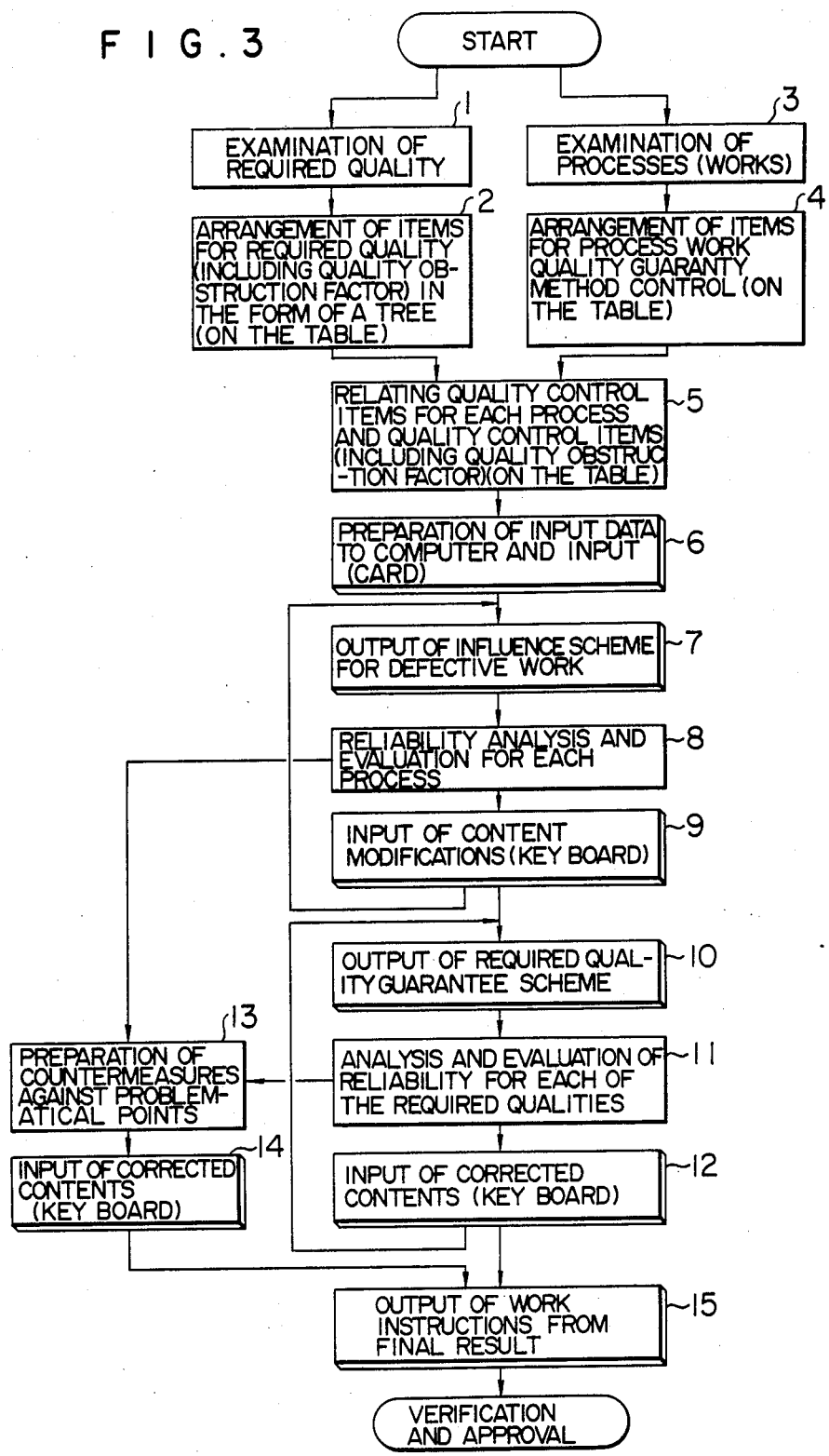
FIG. 3 is a flow chart showing a procedure of reliability analysis and evaluation for manufacturing and controlling processes representing an embodiment according to this invention.

FIG. 3 is a flow chart showing a procedure of reliability analysis and evaluation for manufacturing and controlling processes representing an embodiment according to this invention.

In FIG. 3, the steps ①-⑥ to the system sequence (i) described above; (ii) and (iii) are realized by processing in a computer; and the steps ⑦ and ⑩ correspond thereto. Further, the steps ⑦-⑨ correspond to the system sequence (iv); the steps ⑩ - ⑫ correspond to the system sequence (v); and the step ⑮ corresponds to the system sequence (vi). That is, the steps ①-⑥ are preparatory works and represent a procedure for the preparation of a draft of input data. In the steps ⑦-⑨ an influence scheme for defective works indicated in FIG. 1 is outputted for each of the processes and reliability is examined by using it. In the case where the influence scheme for defective works should be corrected, every time the necessary corrections are inputted by terminals. Then, returning to the step ⑦, the modified items described above are realized for all the processes. The steps ⑩ - ⑫ output a required quality guarantee scheme indicated in FIG. 2 for each of the required qualities and reliability is examined by using it. In the case where the required quality guarantee scheme scheme should be corrected, every time the necessary corrections are inputted by terminals. Then, returning to the step ⑩ , the modified items described above are realized for all the processes.

In the steps, ⑬ - ⑭ , countermeasures against the problematical points pointed out through the examination mentions above are prepared and the results thus obtained are corrected by terminals and inputted. The step ⑮ carries out verification and approval of the final results and outputs commands in the form of "work instructions" to the manufacturing and controlling processes.

Further, in FIG. 3, the single line blocks are those where operations are effected manually. On the other hand, the double line blocks are those where operations are effected by support systems (terminals, the computer, etc.). Objects of the examination in the step ① in FIG. 3 are product specifications, design specifications, catalogues, claim information, examples of deficiencies, etc. and those in the step ③ are processes, works, quality control items, quality guarantee methods, deficiency potential (quality obstruction factors), etc. Furthermore, the step ⑤ includes pickup of lacunes in the quality control item for each of the processes. Further, input data of the step ⑥ include item content data and data concerning the interrelation between different items. Moreover, the analysis and evaluation in the step ⑧ include e.g. quality obstruction factor, pickup of lacunes in the quality control item, pickup of points where the content of a quality control item is not clear, examination of whether the adopted quality guarantee method is adequate or not, etc. The analysis and evaluation in the step ⑪ include e.g. pickup of lacunes in the quality control item, pickup of lacunes in the examination item (required quality which has not been verified during the process), pickup of doubled examination items, pickup of deficiencies in the design, examination of sufficiency from the viewpoint of both the aspects, manufacturing and control, etc.

Figure 4:
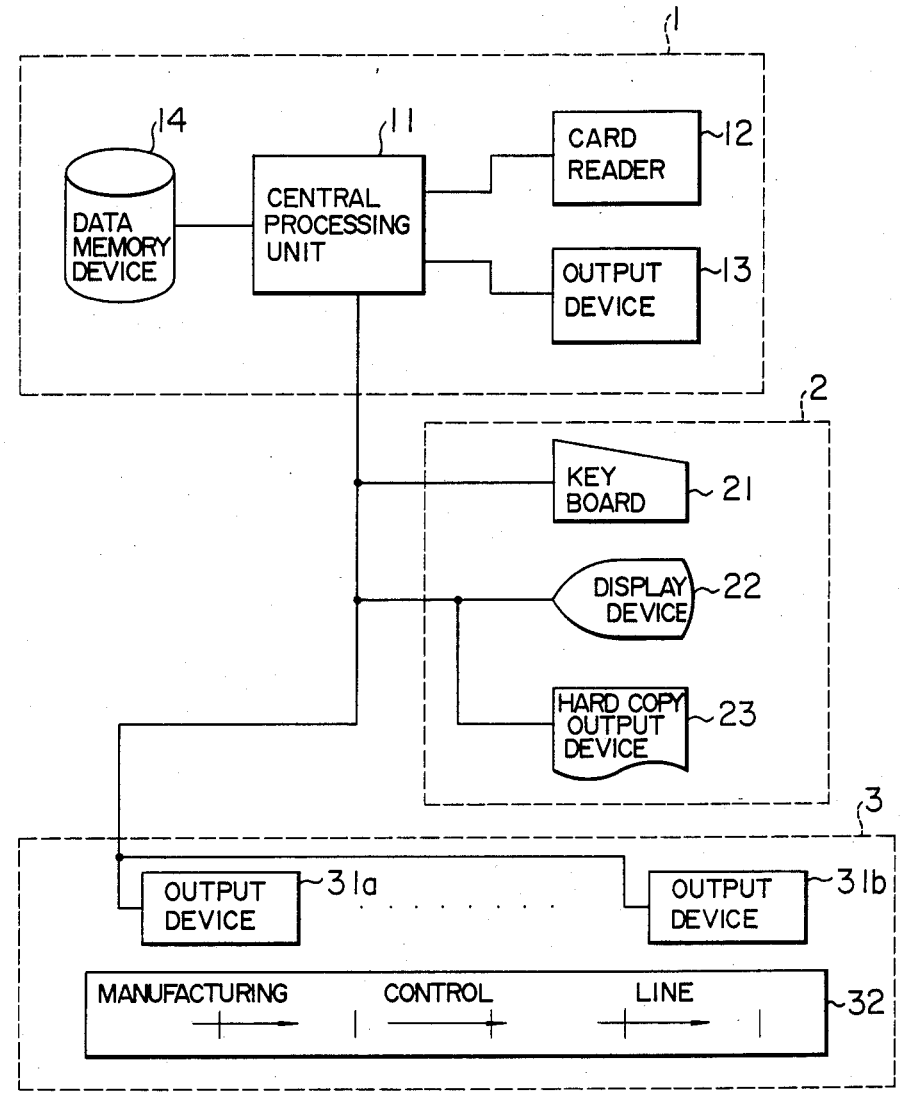
FIG. 4 is a block diagram showing the system construction representing the embodiment according to this invention.

FIG. 4 is a block diagram showing the system construction representing the embodiment according to this invention.

In FIG. 4, the reference numeral 1 denotes a computer center; 2 is a terminal room; and 3 represents manufacturing sites. In the computer center 1, analysis, intercept, drawing, correction, copy, division, unification, etc. of inputted commands are realized by a central processing unit (CPU) 11; a card reader 12 effects input of new data; an output device 13 outputs influence schemes for defective works, required quality guarantee schemes, work instructions, etc. in large quantities; and a data memory device 14 stores item data, data relating to the interrelation between different items, etc. Further, in the terminal room 2, various sorts of commands and corrected data are inputted by means of a keyboard 21, and influence schemes of defective works, required quality guarantee schemes, etc. obtained as results are displayed in a display device 22. Images of the display device 22 can be printed on paper by means of a hard copy output device 23. In the manufacturing sites 3, control tables, such as work instructions, are outputted by output devices 31a, 31b, ... for each of workers in the manufacturing and controlling processes 32. In addition, output devices 31a, 31b, etc. can be replaced by output results from the output device 13 or the hard copy output device 23. Moreover, the card reader 12 in the computer center 1 can be replaced by the keyboard 21.

Figure 5:
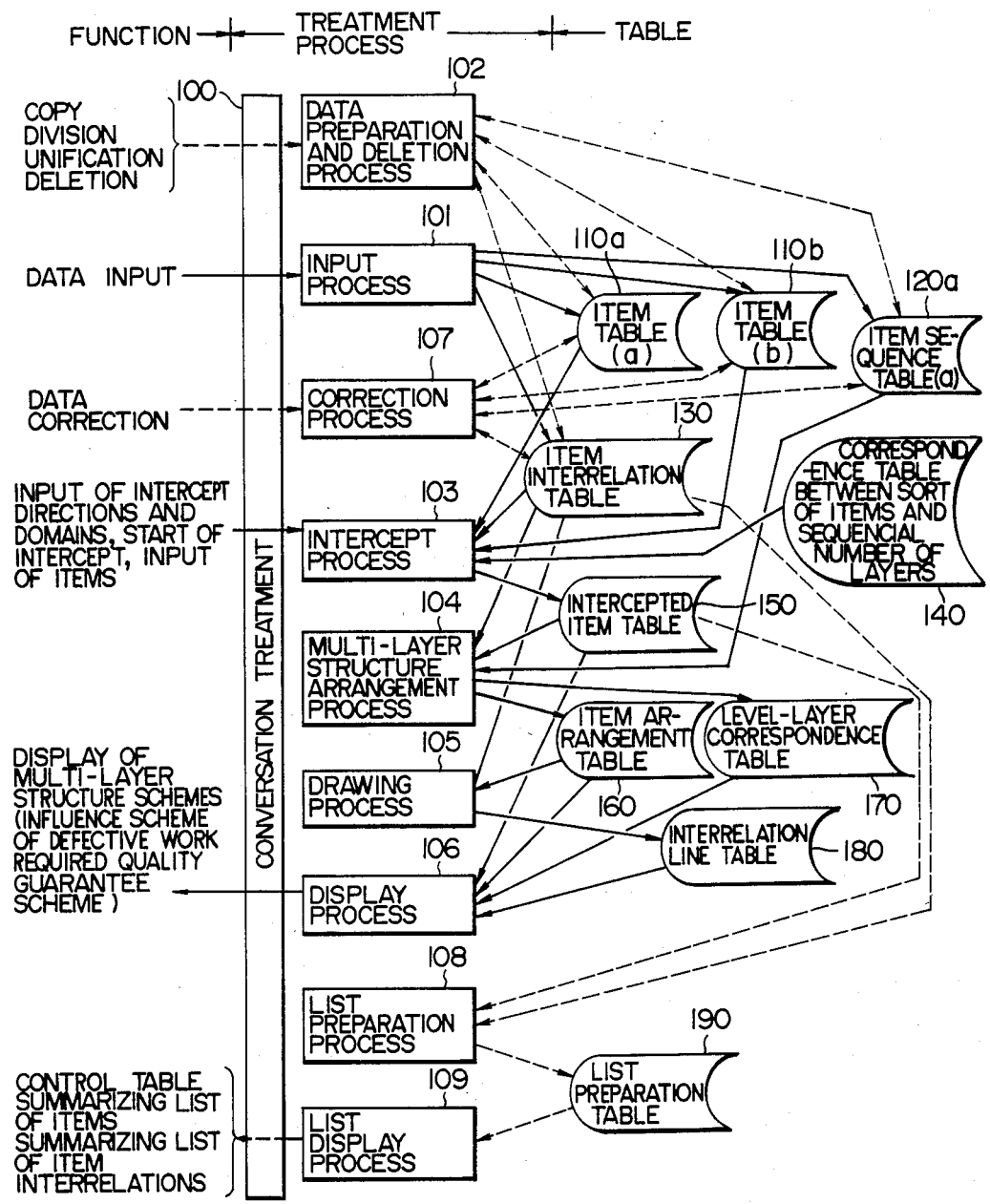
FIG. 5 is a diagram showing flow of processing for the system indicated in FIG. 4.

FIG. 5 is a diagram showing the flow of processing for the system indicated in FIG. 4.

The arrows indicated in full line represent flow of principal information and those indicated in broken line represent flow of supplementary information.

Each of the functions is carried out through conversation treatment 100 between users and treatment processes. That is, in the conversation treatment 100, the commands inputted by terminals are decomposed and inputted information is transformed into internal code, and in addition guidance messages, error messages, etc. are outputted. Input processing 101 stores data concerning each of the items of sort A, sort B, ... (hereinbelow called item data) in respective item tables 110a, 110b, ..., flow sequence of same sort of items in item sequence tables 120a, ... according to the sort, and interrelations between different items in item interrelation tables 130. A data preparation and deletion process 102 copies, divides, and unifies existing item tables 110a, 110b, ..., item sequence tables 120a, ..., and item interrelation tables 130, respectively, and prepares their tables by forming data for other objects or deletes some of their tables. An intercept process 103 follows interrelations in intercept directions (i.e. to higher rank, to lower rank, or to both) in interrelation tables 130, starting from items where intercept operations begin; extracts the items in intercept domains from item tables 110a, 110b, ...; and sets them in intercepted item tables 150 for each of the layers. In this case, correspondence between the order of the layers and the sort of items is determined by the table 140. A multi-layer structure arrangement process 104 determines the arrangement of the multi-layer items and sets them in an item arrangement table 160, arranging the items of the intercepted item table 150 on the basis of the interrelations between different items in the item interrelation table 130 according to the order of the layers in one direction and according to the order of the item sequence tables 120a, . . . in the direction which is perpendicular to the former, and at the same time prepares a correspondence table 170 relating the lebels and the layers. A drawing process 105 determines lines representing interrelations between different items in the multi-layer structure scheme on the basis of the item arrangement table 160 and the item interrelation table 130 and sets the coordinates in an interrelation table 180. A display process 106 prepares transmission data corresponding to a domain which is to be displayed in one image in the multi-layer structure scheme, basing on the data in the intercepted item table 150, the item arrangement table 160, the level-layer correspondence table 170 and the interrelation line table 180. A correction process 107 renews the item tables 110a, 110b, . . . the item sequence table 120a, . . . , and the item interrelation table 130, corresponding to corrected contents. A list preparation process 108 prepares layer lists, item lists, item interrelation lists, etc. in the form of a list preparation table 190 on the basis of the data in the intercepted item table 150 and item interrelation table 130. A list display process 109 prepares transmission data of work instructions, a summarizing table of the items and that of the item interrelations.

Before the content of each of the processes mentioned above is described more in detail, the structure of the tables, with which the system is provided, will be explained.

For this system, the 3 sorts of tables, i.e. item tables 110a, 110b, . . . , item sequence tables 120a, . . . and item interrelation tables 130 are prepared in the data memory device 14 and the data remain stored after the termination of the analysis. For one analysis object there exist so many item tables as the number of sorts of items and so many item sequence tables 120a, . . . as the number of sorts of items for which the flow sequence between different items should be specified. The correspondence table 140 for the sorts of items and the layer number is a fixed table. On the other hand the intercepted item table 150, the item arrangement table 160, the level-layer correspondence table 170, the interrelation line table 180 and the list preparation table 190 are temporary tables, which are prepared and used only during analysis operations. Next a construction method for these tables will be explained.

In this embodiment the sorts of items are, as it is clearly shown in FIGS. 1 and 2, 5 sorts; required quality (quality obstruction factor), quality control item, quality guarantee method, work and process, and for the 2 sorts of items, work and process, flow sequence is specified. Hereinbelow the 5 sorts of items, required quality (quality obstruction factor), quality control item, quality guarantee method, work and process, are represented for simplicity by Q, F, M, A and P, respectively. This system is provided with 5 item tables 110a, 110b, 110c, 110d and 110e, corresponding to 5 sorts of items, Q, F, M, A and P. All these tables have a same table structure.

FIG. 6 is a construction scheme of an item table used for this invention.

Data of each item in the item table consist of item ID, item content and attribute. An item ID is used as a reference key. An item content is a sentence expressing an item. An attribute consists principally of numbers and as one of its modes of use, it is used for differentiating the manufacturing works from the controlling works in the work item. FIG. 6 shows a list type structure, but it can be expressed in any form, e.g. in a form, in which the data of each item 111a, 111b, . . . are connected successively by using pointers.

FIG. 7 is a construction scheme showing an example of item interrelation tables used for this invention.

An item interrelation table 130 consists of interrelation data 131a, 131b, . . . . Each of the interrelation data 131a, . . . consists of two item IDs and two pointers 132, 133 added to them, and shows that two items having these item IDs are interrelated with each other. For example, the interrelation data 131a signify that the item $e_1$ is interrelated with the item $e_3$. The sequential relationship of 2 item IDs in the interrelation data indicates the direction of the interrelation. The pointer 132 at the front side in the interrelation data signifies that the item ID at the front side is interrelated with the same item ID and the pointer 133 at the rear side signifies that the iteem ID at the rear side is connected successively with the same item ID. This form can be replaced by another, e.g. by a matrix form. Furthermore it can be so constructed that each of the interrelation data 131a, 131b, . . . is successively connected by using pointers.

FIG. 8 is a construction scheme of an item sequence table for the 2 items, i.e. work (A) and process (P), used for this invention.

One of the construction methods for the item sequence tables 120a, 120b, . . . is not to prepare physically any table in practice, but to divide an item ID 121 consisting of an item of sort A and an item of sort P into two parts, sign part 122 and number part 123, whereby a number representing the flow sequence is inscribed, in the number part 123. By another method, the flow sequence is comprised as an attribute. Moreover, at the top of the sign part 122, is written one of Q, F, M, A and P representing the sort of items.

FIG. 9 is a construction scheme of a correspondence table 140 indicating the relation between the sort of items and the sequential number of layers used for this invention.

This correspondence table 140 consists of the sort of items 141 and a flag 142 indicating whether the indication of the flow sequence between different items is necessary or not.

In this table 140, the sort of items, which is at the i-th position, means that its sequential number of layers is i. If the flag 142, which is at the i-th position, is 1, it means that the i-th layer is one for which the flow sequence between different items is specified. To the contrary, if it is 0, it means that the flow sequence is not specified for it.

Figure 10:
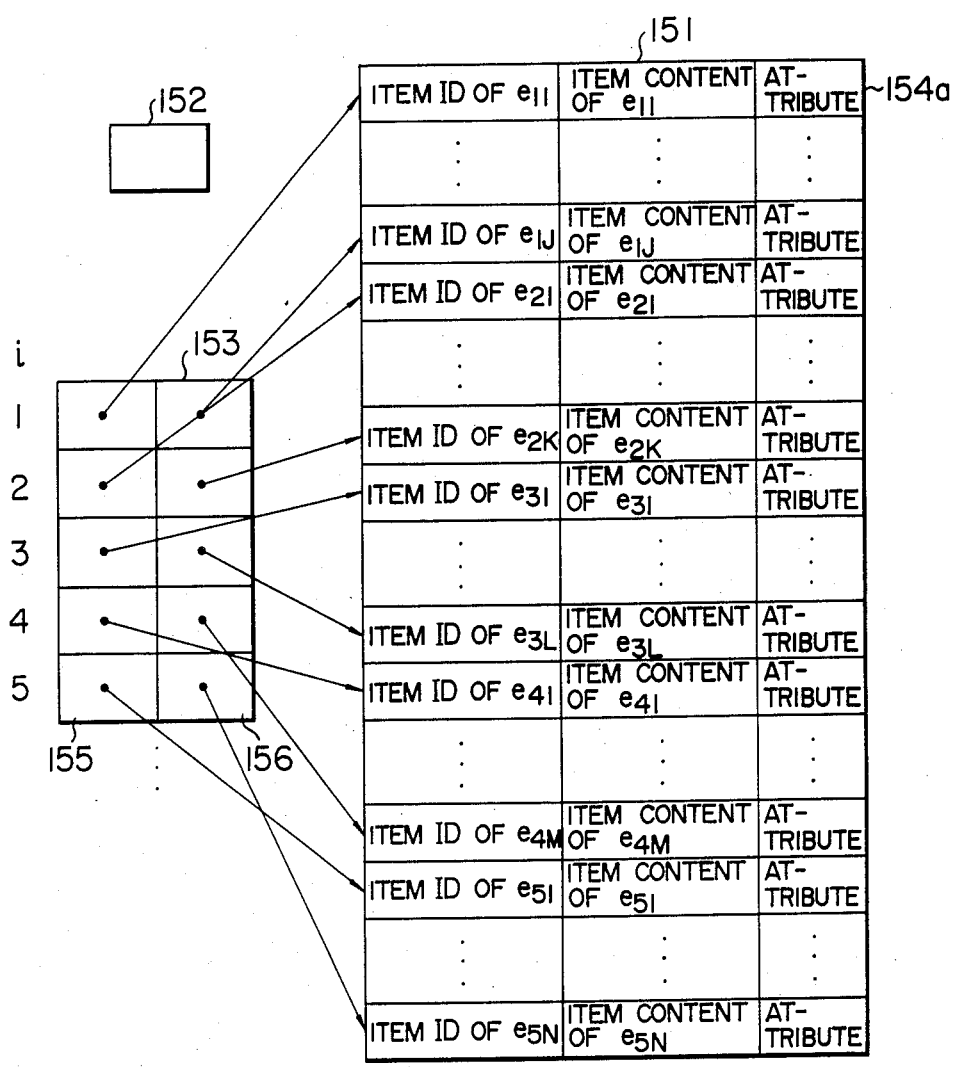
FIG. 10 is a construction scheme of an intercepted item table used for this invention.

FIG. 10 is a construction scheme of an intercepted item table 150 used for this invention.

An intercepted item table 150 consists of 3 parts, an intercepted item data list 151, an intercepted item number counter 152, and a layer domain indication list 153. Item data 154a, . . . of the intercepted item data list 151 consist of an item ID, an item content and an attribute. A layer domain indication list 153 consists of a plurality of lines, each of which is composed by 2 pointers 155 and 156 indicating a domain of the layer. For example, FIG. 10 shows that the first layer comprises the items from $e_{11}$ to $e_{1J}$; the second layer comprises the items from $e_{21}$ to $e_{2K}$; the third layer comprises the items from $e_{31}$ to $e_{3L}$, the fourth layer comprises the items from $e_{41}$ to $e_{4M}$, and the fifth layer comprises the items from $e_{51}$ to $e_{5N}$. Further, the intercepted item number counter 152 memorizes the number of items set in the intercepted item data list 151.

FIG. 11 is a construction scheme of an item arrangement table used for this invention.

An item arrangement table 160 consists of an item arrangement matrix 161, a width counter 162 and a level number counter 163. The items are arranged at equal spaces regularly in the horizontal and vertical directions in a multi-layer structure scheme and the elements of the item arrangement matrix 161 are arranged with a one-to-one correspondence therebetween. The line of the item arrangement matrix 161 represents the level number counted from the highest items in the multi-layer structure scheme and the row represents the position in the direction perpendicular to that of the level. Further, in an element (i, j) 164 of the item arrangement matrix 161, when an item exist at the corresponding position in the multi-layer structure scheme, its line number (hereinbelow called item number) in the intercepted item list 151 relating to the item is set. To the contrary, when there exists no corresponding item, 0 is set there. The level number counter 163 memorizes the number of levels in the multi-layer structure scheme. On the other hand the width counter 162 memorizes the maximum value among the widths of the levels in the multi-layer structure scheme.

FIG. 12 is a construction scheme of a level-layer correspondence table 170 used for this invention.

The level-layer correspondence table 170 describes the smallest 171 and the largest 172 among the levels of the items contained in one layer. Each of the line numbers corresponds to the layer sequence number i.

FIG. 13 is a construction scheme of an interrelation line table 180 used for this invention.

Each of the interrelation line data 181a, 181b, . . . of the interrelation line table 180 consists of the item number at the beginning side 182 of the interrelation line, the item number at the ending side 183, areas 184a, 184b, . . . where the coordinates of the beginning point, bending points and the ending point of the interrelation line are set, and the attribute representing the sort of the interrelation line 185. In this embodiment, since an interrelation line has at most 4 bending points, there exist 6 position coordinate set areas 184a, 184b, 184c, 184d, 184e and 184f. The position coordinates of each of the points in the interrelation line are represented by a pair of coordinates X and Y. These coordinates are set successively in the order of the beginning point, the bending points and the ending point 184a, 184b, . . . , and in the case where any position coordinate set area is not used, 0 is set there.

FIG. 14 is a diagram for explaining the interrelation lines in FIG. 13.

By taking the interrelation between an item (E) 186 and an item (G) 188 indicated in FIG. 14 as an example, the item number of the item E is stored in the area 182 in FIG. 13; the item number of the item G in the area 183; coordinates of the beginning point c, a bending point d, a bending point e and the ending point f in areas 184a, 184b, 184c and 184d, respectively, as interrelation line data. In areas 184e and 184d 0 is set and attributes representing full lines are stored in an area 185.

Moreover, in the case where the item (E) 186 is interrelated with an item (H) 189, areas from 184a to 184d in FIG. 13 are filled.

Figure 15:
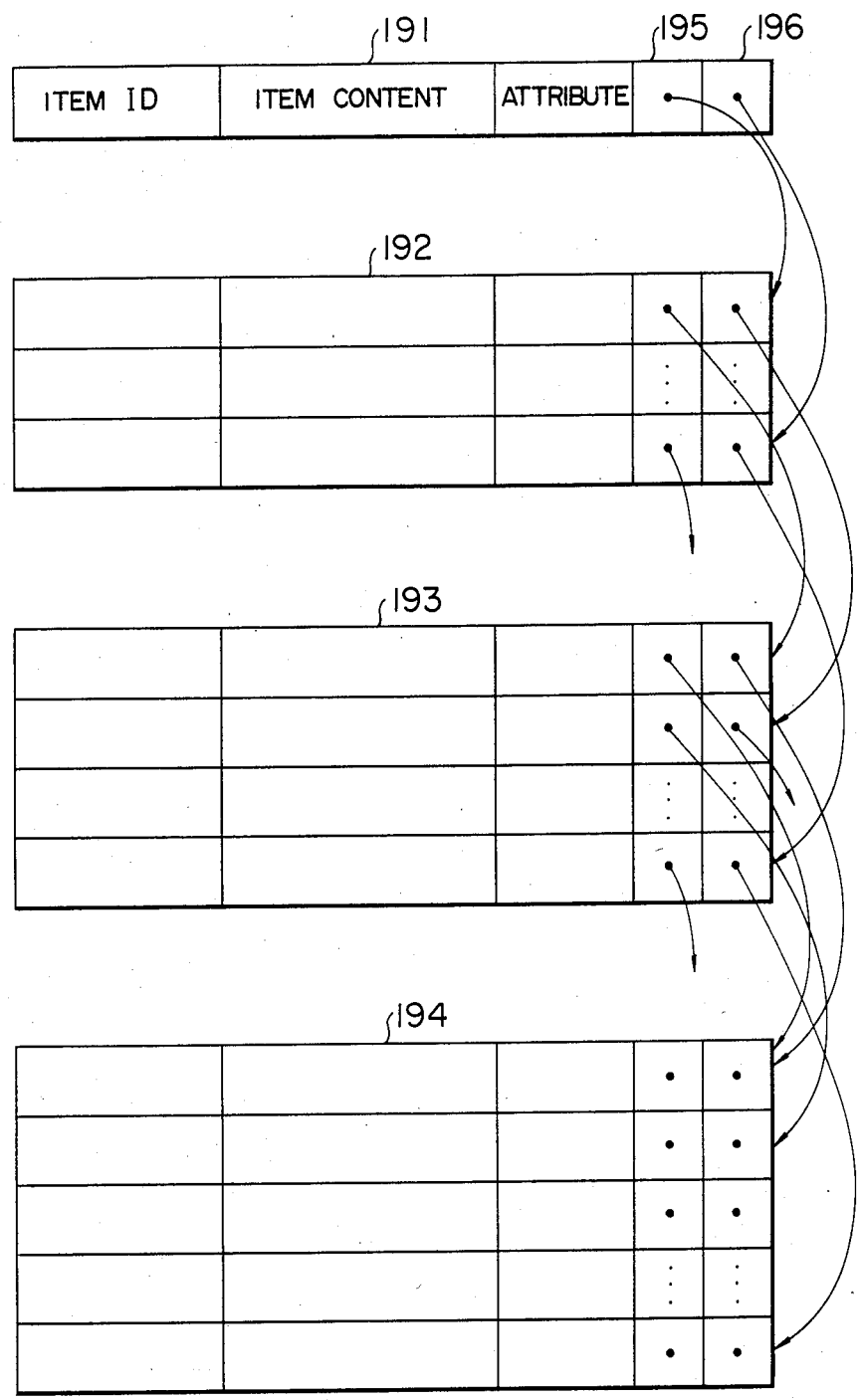
FIG. 15 is a scheme showing an example of control tables used for this invention.

FIG. 15 is a scheme showing an example of list preparation tables used for this invention.

List preparation tables 190 are different according to the sort of lists, i.e. control table, summarizing list of items, summarizing list of interrelations, etc. FIG. 15 indicates a construction method for the list preparation table 190 in the case of a work instruction table, which is one of control tables.

FIG. 16 is a scheme showing an example of work instruction manuals used for this invention.

A work instruction manual is a list, in which, as indicated in FIG. 16, the name of the manufacturing process 197b, the name of the process 197a, the name of workers who are in charge of the process 197c and the work procedure 198a are inscribed and further the content of the work 198b, the quality control items 198c for the work, the required qualities 198d on which the required qualities 198d have influences, and remarks 198e are inscribed according to the sequence of the work procedure 198a.

The list preparation table 190 indicated in FIG. 15 consists of 4 lists, i.e. a process item list 191, a work item list 192, a quality control item list 193 and a required quality list 194. Each of the item lists is a list of item data consisting of an item ID, an item content, an attribute as well as a pointer (A) 195 and a pointer (B) 196. The pointer (A) 195 and the pointer (B) 196 of each of the item lists 191, 192 and 193 indicate the first position and the last position, respectively, of the relating items in the item lists 192, 193 and 194. In the work item list 192 the items are arranged according to the flow sequence.

The outline of the tables has been above explained. Now treatment of the system by using these tables will be explained.

This analyzing system is realized in a conversation form by using the commands indicated in Table 1.

TABLE 1

| CODE | COMMAND | FUNCTION |
| --- | --- | --- |
| 1 | TREE | Intercept and display from the multi-layer structure schemes |
| 2 | AMEND | Correction of data |
| 3 | LIST | Edition and display of various lists |
| 4 | FILE | Preparation and deletion of data |
| 5 | END | Termination of the system |

Hereinbelow, for each of the commands, their function will be explained.

(1) The TREE command has a function to intercept items from object data specified by its operand and to display multi-layer structure schemes on the display device 22 indicated in FIG. 4. In this case the direction and the domain of the intercept as well as the intercept beginning item are inputted as supplementary inputs. There are 3 sorts of intercepts, i.e. direction toward higher rank, direction toward lower rank and both directions. Further, for specifying the intercept domain, there are two methods, one according to which 2 layers are specified and the other according to which the number of levels is specified. In the case where layers are specified, items are intercepted from those belonging to the 2 specified layers and the layers comprised therebetween.

FIG. 17 is a scheme showing combinations of the direction and the domain of intercept used for this invention.

For specifying the domain of layers, there are 15 methods therefor, as indicated in FIG. 17. In the case where levels are specified, items are intercepted from those whose level difference from the intercept beginning item is smaller than the specified number of levels. Schemes obtained by using the combinations in the domain shown in FIG. 17 can be used as results of an analysis either in course or terminated.

For example, in order that an influence scheme for a defective work is displayed, the direction toward higher rank as an intercept direction, the whole domain (Q—P) as an intercept domain and the process item as an intercept beginning item are specified. To the contrary, when the required quality is specified as the intercept beginning item and items are intercepted in the whole domain toward lower rank, a required quality guarantee scheme is displayed. Further, it is also possible to specify a plurality of items as the intercept beginning item.

When a multi-layer structure scheme should be displayed and it cannot be put together in one image, it is possible to change the display domain by using a SHIFT subcommand and to see the whole scheme in this way. The shift of the display domain is carried out so that the coordinates specified by operands of the SHIFT subcommand is located at the left and upside corner of the image. Moreover the system is provided with a REPEAT subcommand, which effects intercept for which the intercept direction and domain remain unchanged and only the intercept beginning item is changed. Table 2 indicates these subcommands.

TABLE 2

| CODE | SUBCOMMAND | FUNCTION |
| --- | --- | --- |
| 1 | SHIFT | Shift of display domain |
| 2 | REPEAT | Display of multi-layer structure scheme after modification of intercept beginning item |
| 3 | JUMP | Termination of display of multi-layer structure scheme |

(2) The AMEND command has a function to correct partly object data specified by its operand. For various corrections subcommands indicated in Table 3 are set.

For specifying the AMEND command is used a method, by which an item ID is divided into two parts, sign part 122 and number part 123, as indicated in FIG. 8, and one of Q, F, M, A and P, which indicate the sort of items, is inscribed at the top of the sign part 122. Owing to this, it is also possible to know the sort of items by the item ID.

TABLE 3

| CODE | SUBCOMMAND | FUNCTION |
| --- | --- | --- |
| 1 | ADD | Addition of items |
| 2 | DELETE | Deletion of items |
| 3 | MODIFY | Modification of item contents |
| 4 | CONNECT | Addition of interrelations between items |
| 5 | CUT | Deletion of interrelations between items |
| 6 | UNIFY | Unification of items |
| 7 | INSERT | Insertion of items |
| 8 | CHANGE | Modification of item ID |
| 9 | JUMP | Termination of correction |

The ADD subcommand in Table 3 inputs item IDs, item contents and attributes as supplementary inputs and adds the items to the object data. Next, the DELETE subcommand inputs item IDs as supplementary inputs and thus deletes the items in the object data. The MODIFY subcommand input items IDs and correction contents as supplementary inputs, and thus corrects the item contents. The CONNECt and CUT subcommands input item IDs of the items of high rank and item IDs of the items of lower rank, which are interrelated with each other, as supplementary inputs, and thus interrelates object data and deletes interrelations therebetween, respectively. The UNIFY subcommand inputs item IDs of unifying and unified items as its operands and thus unifies a plurality of items into one item. The INSERT subcommand inputs item IDs, item contents and attributes as supplementary inputs between the items having the item IDs specified by its operand and other items interrelated to the items, and thus inserts new items.

FIGS. 18A and 18B are schemes showing examples of insertion by means of an INSERT subcommand.

In the case where the quality control items F1, F2 and F3 are interrelated with the work item A1, as indicated in FIG. 18A, A1 is inputted as an item ID into the operand. Next, the quality guarantee methods M1, M2 and M3 indicated in FIG. 18B are inputted as supplementary inputs between the quality control items F1, F2 and F3, and thus the quality guarantee method can be inserted between the work items and the quality control items.

The CHANGE subcommand has a function to change item IDs. One of the examples of utilization of this subcommand is modification of flow sequence for work items.

The JUMP subcommand effects the termination of a treatment by an AMEND command.

(3) The LIST command has a function to intercept the necessary parts from object data specified by its operand and to display them in the display device 22 in the form of control tables, summarizing lists of items, or summarizing lists of interrelations between different items.

Table 4 shows subcommands set for the display of various lists.

TABLE 4

| CODE | SUBCOMMAND | DISPLAY LIST FUNCTION |
| --- | --- | --- |
| 1 | TABLE | Control table |
| 2 | ITEMS | Summary of items |
| 3 | RELATIONS | Summary of interrelations between different items |
| 4 | JUMP | Termination of display of lists |

The TABLE subcommand specifies the sort of control items by using its operand. For example, in the case where work instructions are specified by this operand, when an item ID in the process item and the name of a worker are inputted as supplementary input, the work instructions are indicated to the worker who will be in charge of the work.

The ITEMS and RELATIONS subcommands specify the sort of items etc. indicated by its operand display a summarizing list of items and a summarizing list of interrelations between different items, respectively, for the items belonging to those specified. The JUMP subcommand terminates a treatment of the LIST command.

(4) The FILE command prepares data by copy, division or unification, and also deletes data. Table 5 shows these subcommands for preparing and deleting data.

TABLE 5

| CODE | SUBCOMMAND | FUNCTION |
|---|---|---|
| 1 | COPY | Copy of data |
| 2 | DIVIDE | Division of data |
| 3 | MERGE | Unification of data |
| 4 | CLEAR | Deletion of data |
| 5 | JUMP | Termination of preparation or deletion of data |

The COPY subcommand registers existing data specified by its operand as data belonging to another object. The DIVIDE subcommand divides existing data specified by its operand just as the TREE command, by specifying the direction and the domain of intercept and the intercept beginning item and registers the data thus divided as data belonging to another object. The MERGE subcommand has a function to unify data belonging to 2 objects specified by its operand and to register the data thus unified as data belonging to another object. The JUMP subcommand terminates a treatment of the FILE command.

Figure 19A:
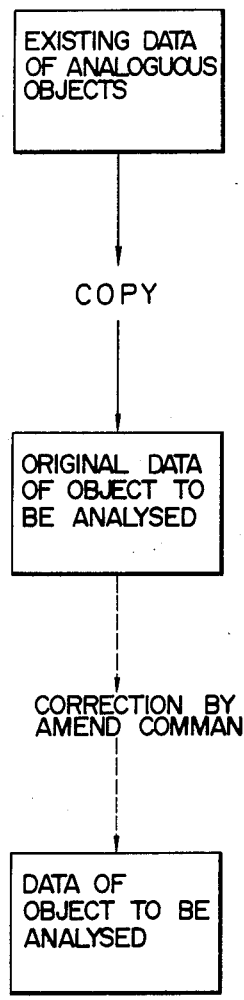
FIGS. 19A and 19B are schemes showing preparation of data, which are to be analyzed, by means of a FILE command.
Figure 19B:
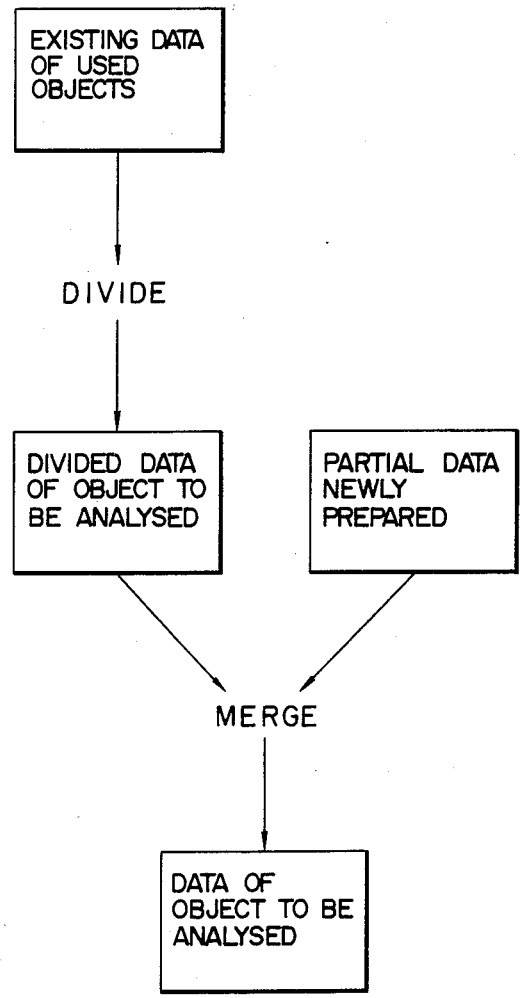

FIGS. 19A and 19B are schemes showing preparation of data, which are to be analyzed, by means of a FILE command.

FIG. 19A shows a case where analoguous data are used and FIG. 19B indicates a case where a part of existing data is used.

The former is a method, by which existing data belonging to an analogueous object are copied by using a COPY subcommand and the data thus copied are corrected by using an AMEND command. The latter is a method, by which data belonging to an object, which is to be analyzed, are prepared by dividing a part of existing data in the required quality part, etc. belonging to an object which is to be utilized by using a DIVIDE command and by unifying the data thus obtained with partial data newly prepared by using a MERGE subcommand.

(5) The END command has a function to terminate the system.

Among the functions meentioned above the TREE and LIST commands can output displays to the output device 13 besides the display device 22 indicated in FIG. 4. Moreover the TABLE subcommand of the LIST command can output displays also to output devices at the manufacturing sites 31a, 31b, ....

The system is provided with, besides the functions described above, support programs by batch, such as input of data, output of multi-layer structure schemes and various lists to the output device 13, dump and reload of data, etc.

The input of data has a function to newly register object data coming from the card reader 12 and to add items or interrelations between different items to existing object data. Since the output of multi-layer structure schemes and various lists is essentially identical to that for the treatment by the TREE and LIST commands of the conversation system, it is no more described.

FIG. 20 is a flow chart of the whole process of a conversation type support system according to this invention.

In the user ID input processing (Step 200), the user IDs and pass words set for the user IDs are inputted for the purpose of secret protection, and also initial values for various work areas are set.

The user ID check (Step 300) checks whether the previously inputted user ID and pass words are identical to those registered in a registration list or not. When the user ID is not yet registered or when the pass words are not identical, the processing of the system is terminated. When the user ID is registered and the pass words are not identical, it proceeds to the comnand input analysis processing (Step 400). In the command input analysis processing, commands inputted by a terminal are transformed into the codes indicated in Table 1, and adequacy of the name of the analysis object data inputted as its operand and presence or absence of corresponding registration are checked. If it is normal, the analysis object data having the name are treated according to the processes described below. If some errors are found, the processing outputs error messages and waits for re-input of commands. In Step 500 the processing transmits the control to a corresponding processing according to the code of the command. When one of the steps, intercept and display of a multilayer structure scheme (Step 600), correction of data (Step 700), edition and display (Step 800) and data preparation and deletion (Step 900) terminates, the processing returns again to the command input analysis processing (Step 400) and the process described above is repeated.

Figure 21:
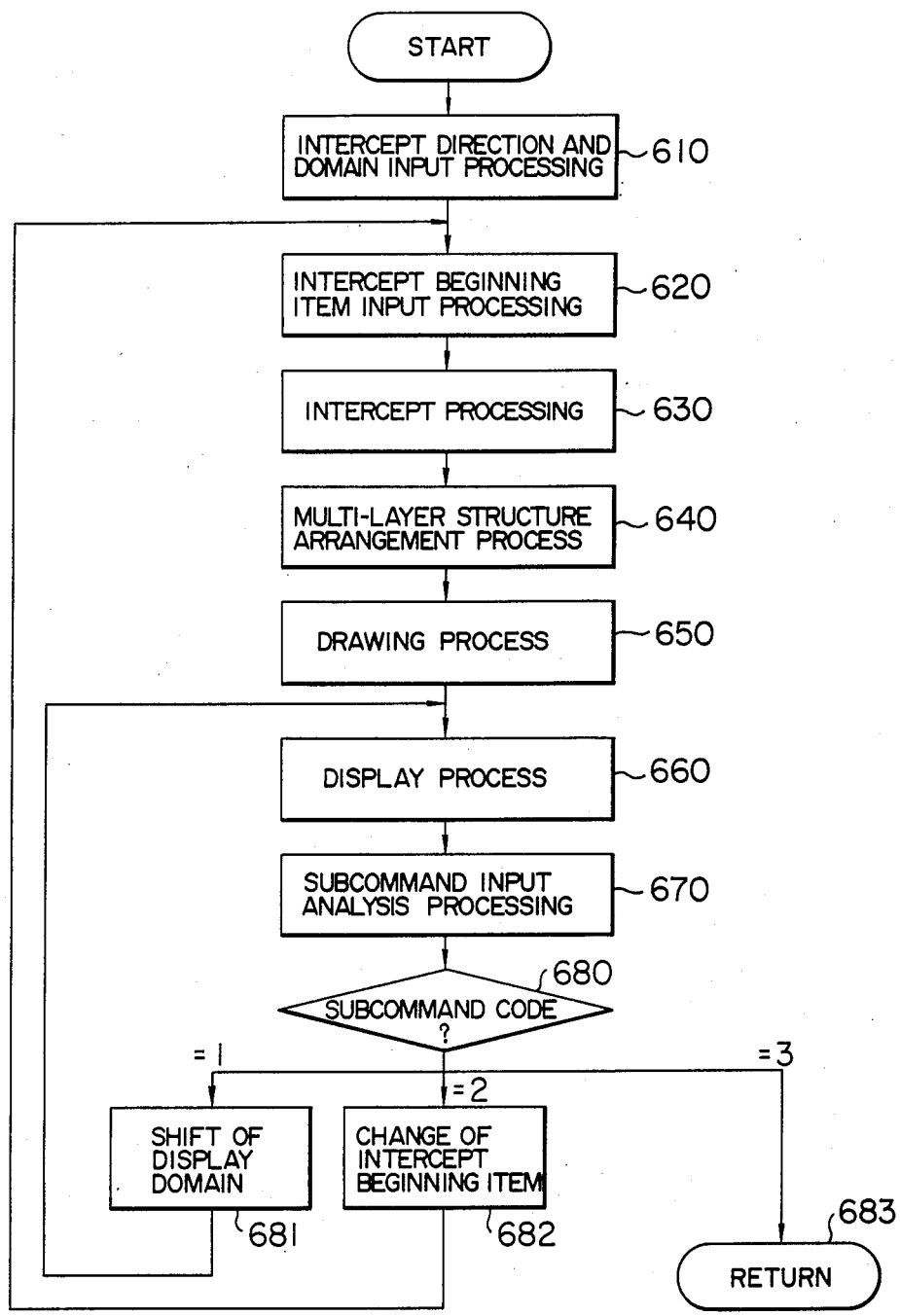
FIG. 21 is a flow chart of the intercept and display process for the multi-layer structure scheme of FIG. 20.

FIG. 21 is a flow chart of the intercept and display process for the multi-layer structure scheme of FIG. 20.

In Step 610, the process effects the intercept direction and domain input processing. That is, the intercept direction and domain are inputted by a terminal and their adequacy is checked. If there are no errors, they are transformed into internal codes and the control is transmitted to the succeeding processing. If some errors are found, the processing outputs error messages and waits for re-input of commands. In addition, combinations of the intercept directions and domains are those indicated in FIG. 17. Next, in Step 620, the intercept beginning item input process is effected, that is, item IDs of the intercept beginning item are inputted by a terminal. The process checks whether those item IDs are present in item tables 110a, 110b, . . . 110e of the analysis object data, and if there is none, the process outputs error messages and waits for re-input of commands. If they are present, the process proceeds to the following intercept processing. The intercept processing in Step 630 is indicated in the flow chart of the intercept process of FIG. 22 in detail.

Figure 22:
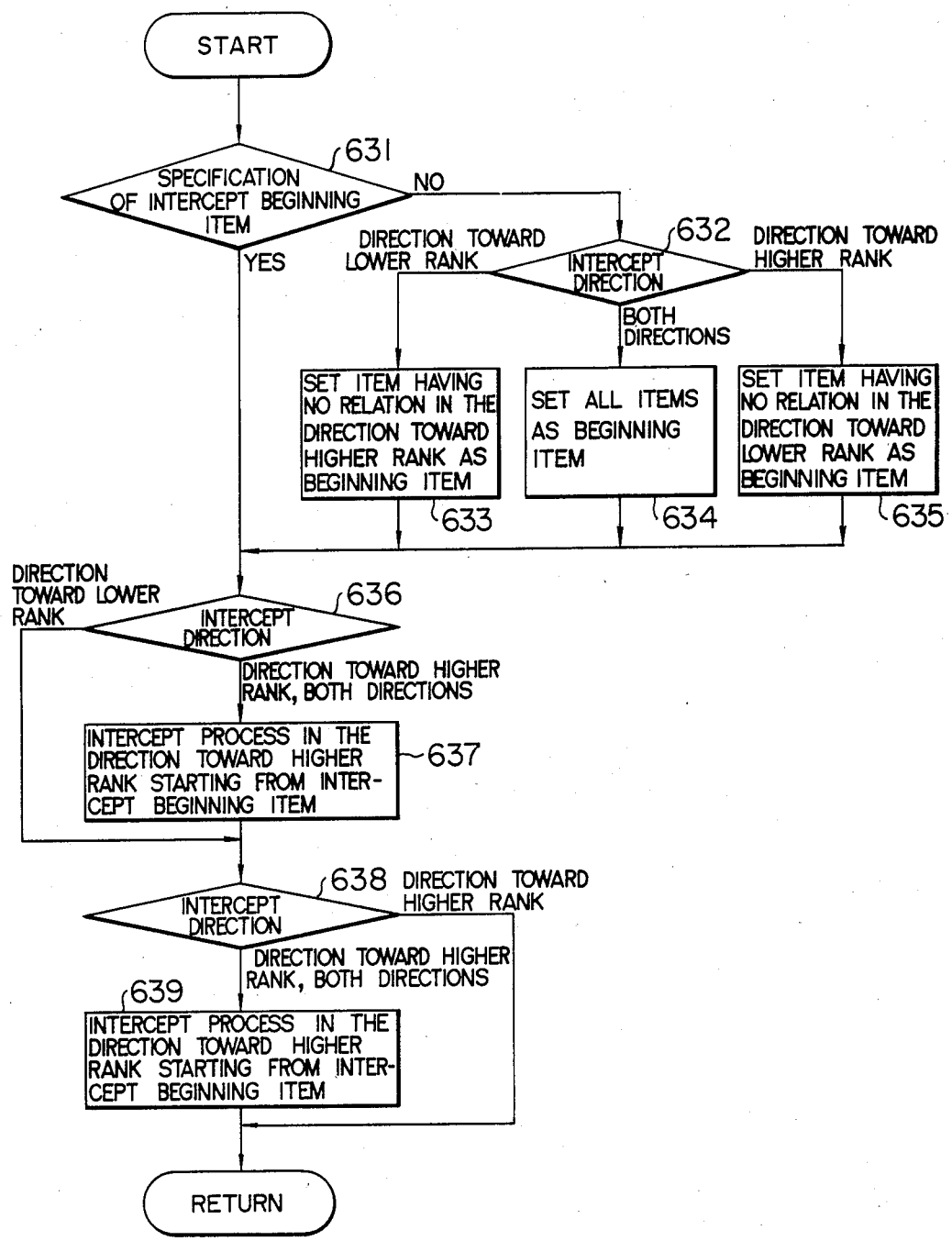
FIG. 22 is a flow chart of the intercept process indicated in FIG. 21.

In FIG. 22, whether there are specifications of the intercept beginning items or not is checked by judgment in Step 631. If there are some, the intercept direction is checked by judgment in Step 636, and if there is none, it proceeds to judgment of the intercept direction in Step 632. In Step 632, what is the intercept direction, i.e. direction toward higher rank, direction toward lower rank, or both directions, is judged. Depending on this judgment, one of the Steps 633, 634 and 635 is carried out. Step 633 finds all the items having no relation toward higher rank (that is, items having an item ID, which is not in the preceding item IDs of each of the interrelation data 131a, . . . in the interrelation table 130 in FIG. 7, and at the same time existing in the item table 110a, . . . ), referring to the item tables 110a, 110b, . . . and the item interrelation table 130, and adopts them as intercept beginning items.

Step 634 adopts all the items belonging to the item tables 110a, . . . 110e as intercept beginning items. Step 633 intercepts all the items having no relation toward lower rank, referring to the item tables 110a, . . . , 110e and the item interrelation table 130. When one of Steps 633, 634 and 635 terminates, Step 636 judges the intercept direction. If it is the direction toward lower rank, Step 638 is effected. If it is the direction toward higher rank or both directions, the process of Step 637 is carried out. Step 637 reads out the intercept beginning items belonging to intercept domains from the item tables 110a, . . . and sets them in the intercepted item lists 151 in the intercepted item table 150 indicated in FIG. 10. Next, for the item IDs existing in the item list 151, if there are some related data identical to succeeding item IDs of the interrelation data in the interrelation table 130 indicated in FIG. 7, the items having preceding item IDs of the interrelation data are read out from the item tables 110a, . . . and only when the items thus read out are in intercepted items, they are set for each of the layers in the item list 151 without any duplication. However, concerning the correspondence between the sort and the layer of the items, the table 140 should be referred to. The processings described above are successively repeated for all the items set in the item list 151. Moreover, in this procedure, the intercepted item number counter 152 and the layer domain indication list 153 are renewed. When Step 637 terminates, Step 638 judges the intercept direction. When it is the direction toward lower rank or both directions, the process of Step 639 is effected, and when it is the direction toward higher rank the intercept process is terminated. The process in Step 639 reads out, just as in Step 637, the related items successively, starting from the intercept beginning items, referring to the item tables 110a, . . . and the item interrelation table 130, and sets the item data of the items within the intercept domains in the intercepted item list 151 for each of the layers without duplicatibn. Moreover, the intercepted item number counter 152 and the layer domain indication list 153 are renewed. The intercepted item table 150 is prepared by the intercept procedure described above.

Returning to FIG. 21, the following Step 640 carries out the multi-layer structure arrangement process and divides the items in the intercepted item table 150 in different layers and levels for each of the layers, on the basis of the interrelation data of the item interrelation table 130. That is, the horizontal coordinate of the items in the multi-layer structure scheme indicated in FIG. 1 is determined. Next, the vertical coordinate of the items in FIG. 1 is determined by using the item interrelation table 130 so that the items of sort A and those of sort P are arranged in the vertical direction in the order of the item sequence table 120a and 120b. The item arrangement thus determined is inscribed in the item arrangement table 160 indicated in FIG. 11 and at the same time the level-layer correspondence table 170 indicated in FIG. 12 is prepared.

In the drawing process of Step 650, the interrelations between different items set in this item arrangement table 160 are read out from the item interrelation table 130 indicated in FIG. 7. Then, the interrelation lines representing interrelations therebetween are drawn and the coordinates of their starting, bending and ending points are set in the interrelation line table 180 indicated in FIG. 13.

The display process in Step 660 draws a rectangular box at a corresponding position on the image screen of the display device 22 for each of the items in the item arrangement table 160, and displays an item ID and an item content of a corresponding item therein, reading out them from the intercepted item table 150. However, the form of the box can be varied according to the attribute of the item. The coordinates of the interrelation line data 181a, . . . of the interrelation line table 180 are transformed into corresponding coordinates on the image screen of the display device 22 and the interrelation lines are indicated thereon in different lines depending on their attribute in the order of their starting, bending and ending points. Finally, the termination of each of the layers are drawn, referring to the level-layer correspondence table 170 and the sort of items is displaced for each of the layers. As explained above, after having displayed the multi-layer structure scheme, the system proceeds to the subcommand input analysis process in the following Step 670. This input analysis process transforms the subcommand inputted by a terminal into the codes indicated in Table 2, and checks adequacy of its operand. If there are no errors, the system proceeds to the following Step 680, and if some errors are found, it outputs error messages and waits for re-input of another subcommand. The judgment in Step 680 directs the processing depending on the code of the subcommand. That is, if the code of the subcommand is "1", the domain of the display is corrected to that specified by the operand of the SHIFT subcommand, and by returning to Step 660, the display process is effected. If the code of the subcommand is "2", the intercept beginning item is changed. That is, by returning to Step 620, the intercept beginning item input process is carried out. Further, if the subcommand code is "3", the intercept display process (Step 600 in FIG. 20) of the multi-layer structure scheme is terminated.

Figure 23:
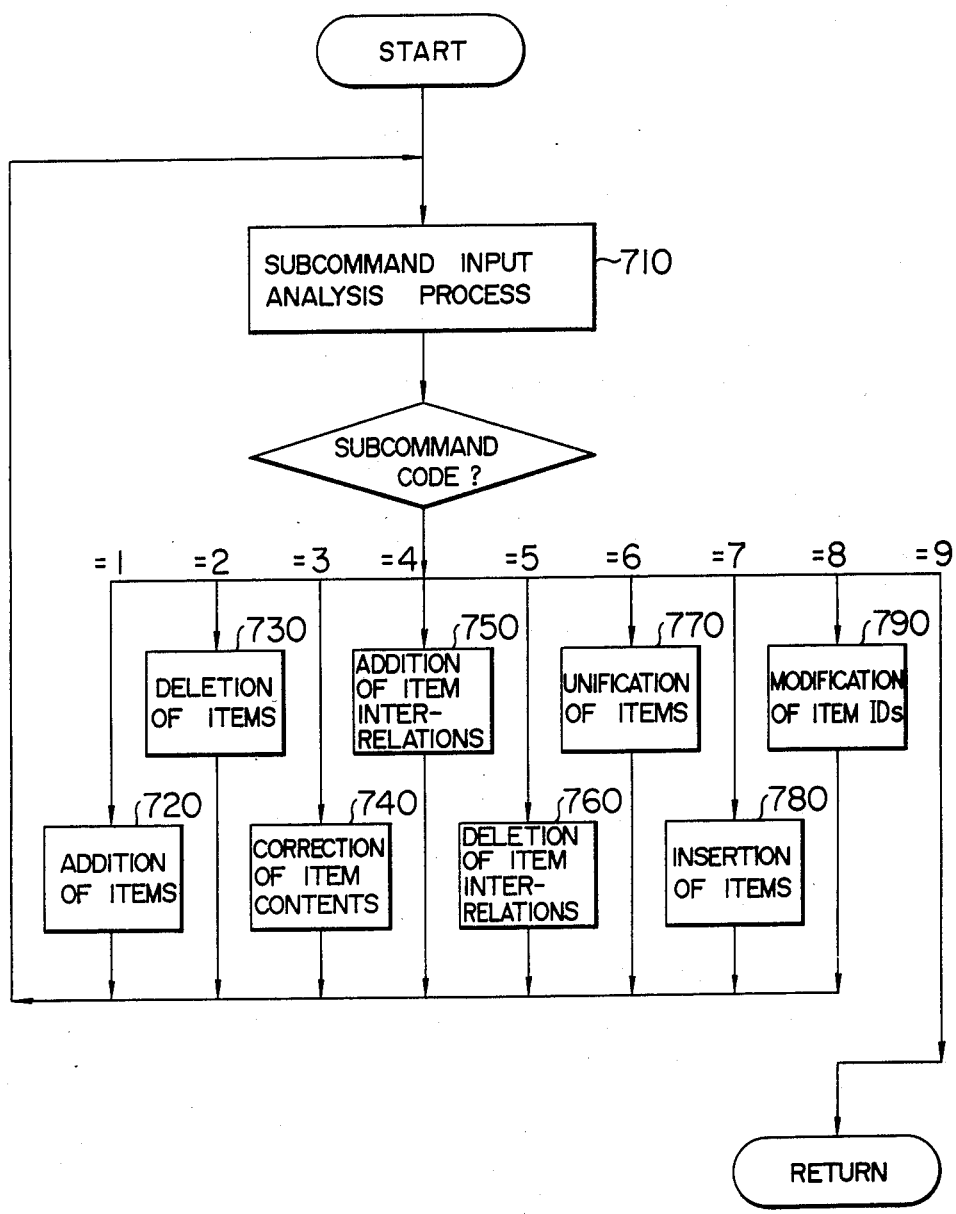
FIG. 23 is a flow chart of the data correction process indicated in FIG. 20.

FIG. 23 is a flow chart of the data correction process indicated in FIG. 20.

At first, in the subcommand input analysis process in Step 710, a subcommand is read out by a terminal, and as the result, the subcommand code indicated in FIG. 3 and operand information are obtained. However, if errors are found during this procedure, the process outputs error messages and waits for re-input of another subcommand. Next, it directs the processing to one of Steps 720–790, depending on the subcommand code. Then, when one of the processes terminates, returning again to Step 710, it proceeds to the subcommand input analysis process.

When the subcommand code is "1", the item addition process of Step 720 is effected; the item ID, the item content and the attribute of items which are to be added are inputted as supplementary input; and item data 111a consisting thereof are added to the item table 110.

When the subcommand code is "2", the item deletion process in Step 730 is effected; by inputting the item ID of items which are to be deleted, item data 111a having the item ID are deleted from the item table 110; and further all the interrelation data 131a having the item ID are deleted from the item interrelation table 130.

When the subcommand code is "3", the item content correction process in Step 740 is effected, and by inputting the item ID of items which are to be corrected and the item content or the attribute which is to be corrected by using a terminal, the correction result is inscribed as an item content or an attribute of the item data 111a in the item table 110 having the item ID. When the subcommand code is "4", the item interrelation process in Step 750 is effected, by inputting a pair of the item ID of an item at the higher rank side and the item ID of an item at the lower rank side in the item interrelation table relating different items as supplementary inputs; interrelation data 131a consisting of this pair are added to the item interrelation table 130. When the subcommand code is "5", the item deletion process in Step 760 is effected, and by inputting a pair of interrelated item IDs intercepting the interrelation as supplementary inputs, the interrelation data 131a consisting of the pair of the item IDs which are identical to those of the item IDs thus inputted are deleted from the item interrelation table 130.

When the subcommand code is "6", the item unification process in Step 770 is effected, and by using the unified item ID and the unifying item ID specified by the operand of the subcommand as input information, the item data having the unified item ID of the item table 110 are deleted, and if one of the item IDs of the pair is identical to the unified item ID for each of the interrelation data of the item interrelation table 130, the item ID is changed to a unifying ID.

When the subcommand code is "7", the item insertion process in Step 780 is effected.

FIG. 24 is a flow chart of the item insertion process (Step 780) in FIG. 23.

Each processing in FIG. 24 will be explained below by taking the item insertion process indicated in FIG. 18 as an example.

At first an interrelation F1-A1 in the direction toward higher rank from the item A1 specified by the operand of a subcommand is read out from the item interrelation table 130. Step 782 checks whether one or more items should be inserted between the item F1 and the item A1 or not. If some items should be inserted, Step 783 is effected, and to the contrary, if no items should be inserted, the system proceeds to Step 787. Step 783 inputs the item ID, the item content and the attribute of an inserted item M1. If the layer to which the inserted item M1 belongs is either the layer to which the item F1 belongs or the layer to which the item A1 belongs or one of the layers comprised between the two layers, Step 784 is effected. In Step 784 the inserted item M1 inputted in Step 783 is added to the item table 110. Further, in Step 785, the interrelation between the item of higher rank F1 and the inserted item M1 and the interrelation between the inserted item M1 and the specified item A1 are added to the item interrelation table 130. In Step 786 the interrelation F1-A1 read out in Step 781 from the item interrelation table 130 is deleted. By the processing described above, the item M1 is inserted between the item M1 and the item F1. Next, in Step 787, Step 781 is effected for the interrelation F2-A1. Moreover, when the insertion processing Steps 781-786 between the items F3 and A1 terminates, the item insertion processing Step 780 is terminated by Step 787.

In the item ID modification Step 790, which is the last in FIG. 23, for the item IDs before and after the modification, specified by the operand of the subcommand, among the item IDs in the item table 110 and the item interrelation table 130, all the item ID which are identical to those before the modification are replaced by the item ID after the modification.

Figure 25:
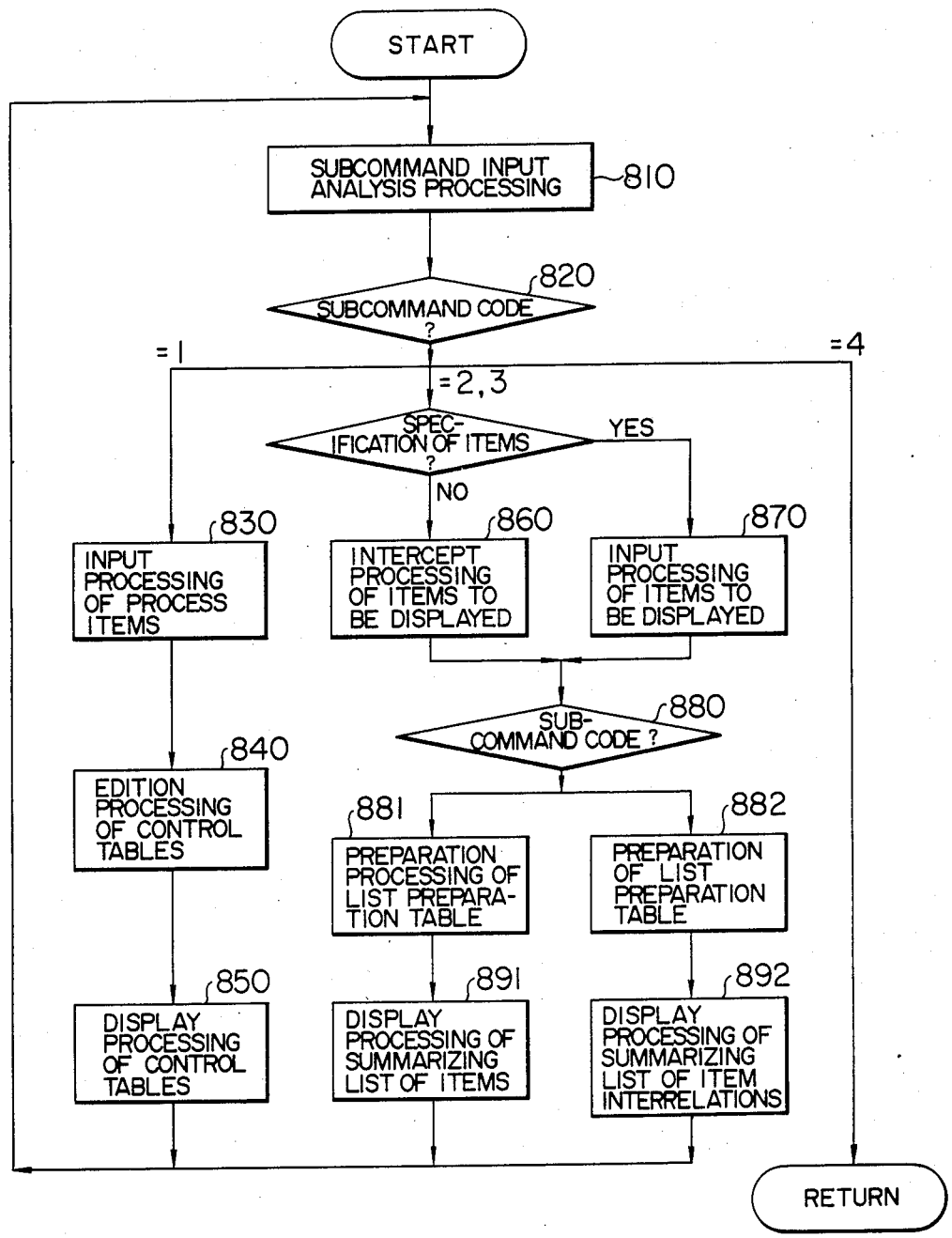
FIG. 25 is a summarized flow chart of the edition and display process for various lists in FIG. 20.

FIG. 25 is a summarized flow chart of the edition and display process (Step 800) for various lists in FIG. 20.

At first, in the subcommand input analysis processing in Step 810, subcommands are read out and as a result, information concerning the subcommand codes indicated in Table 4 and operand is obtained. However, in this procedure, if some errors are found, the system outputs error messages and waits for re-input of the subcommands. Next, Step 820 directs the process, as indicated in FIG. 25, depending on the subcommand code. When each of the edition and display processes terminates, returning again to Step 810, the system proceeds to the subcommand input analysis process. Hereinbelow each of the edition and display processes will be explained.

The edition and display process of a control table is explained, by taking the work instruction manual as an example.

At first, when the subcommand is "1", in Step 830, the item IDs of the process item are inputted and set in the process item list 191 of the list preparation table 190. In Step 840, the intercept process (Step 630) is effected in the direction toward higher rank in a domain of A=P, using the process item as an intercept beginning item. As a result, among the items set in the intercepted item table 150, the items of the fourth layer are set in the work item list 192 in the order of the number part of the item ID, and also the pointers 195 and 196 are set. In the same way, for each of the items in the work item list 192, the intercept process (Step 630) is effected in the direction toward higher rank in a domain of F−P, and the items of the second layer in the intercepted item table 150 are set in the quality control item list 193. Further, for each of the items of the quality control item list 193, intercept is effected in the same way in a domain Q−F, and the items of the first layer in the intercepted item table 150, specifically those whose attribute is 3, are set in the required quality list 194. According to the procedure described above, the display process of the control table is effected on the basis of the list preparation table 190 thus prepared and the work instruction manual is displayed on a display terminal 22.

In the case where the subcommand code is "2" or "3", the edition and display process for each of the summarizing list of items and the summarizing list of interrelations is effected. Depending on presence or absence of the item specification, there are 2 methods for determining the items which are to be displayed. One is processing Step 870, in which the item ID of the items, which are to be displayed, is inputted by a terminal, and the other is processing Step 860, in which by specifying sorts and characteristics of the item, which are to be displayed, the items, which are compatible with this condition, are intercepted and set in the intercepted item table 150. For the summarizing list of items, in Step 881 the items in the intercepted item table 150 are arranged in the order of the item ID, a list preparation table 190 is prepared, and in Step 891 a summarizing list of items is displayed on the display device 22. On the other hand, for the summarizing list of item interrelations, in Step 882 a list preparation table 190 is prepared by using the intercepted item table 150 and the item interrelation table 130 and in Step 892 the summarizing list of item interrelations is displayed.

In the case where the subcommand code is "4", the system returns to Step 400 in FIG. 20 (RETURN).

FIG. 26 is a flow chart of the data preparation and deletion process (Step 900) in FIG. 20.

In the preparation and deletion of data, each of the functions is performed by using the subcommands indicated in Table 5.

At first, in the subcommand input analysis process in Step 910, subcommands are inputted and as a result information concerning the subcommand codes and operands indicated in Table 5 is obtained. Next, in Step 920, the processing is directed as indicated in FIG. 26, depending on the subcommand code and after the termination of the process, by returning to Step 910, the subcommand input analysis process is effected.

In the case where the subcommand code is "1", the data copy process in Step 930 is effected, and item tables 110a, 110b, ..., item sequence tables 120a, ... and item interrelation table 130 of the existing object data specified by the operand of the COPY subcommand are copied respectively and registered as new analysis object data specified by the operand.

In the case where the subcommand code is "2", the data division process in Step 940 is effected and data of the objects which are to be divided and new analysis data are specified by using the operand of the DIVIDE subcommand. For these data of the objects which are to be divided, a series of intercept processes (Step 610–630) in FIG. 21 explained for the intercept and display process (Step 600) for a multi-layer structure scheme mentioned above are effected and the intercept item table 150 is prepared. Next, data for the items set in this intercepted item table 150 are readout from the item tables 110a, ... and the item sequence tables 120a, ... of the data of the objects which are to be divided, and registered respectively in the item tables 110a, ... and the item sequence tables of new analysis object data. In the same way, the interrelations between items in the intercepted item table 150 are read out from the item interrelation table 130 of the data of the objects which are to be divided, and registered in the item interrelation table 130 of new analysis object data.

In the case where the subcommand code is "3", the data unification process in Step 950 is effected, and 2 data which are objects to be unified and new analysis data are specified by using operands of the MERGE subcommand. The item tables 110a, ..., the item sequence table 120a, ..., and the item interrelation table 130 of these data of the objects, which are to be unified, are read out, unified respectively, and registered in the item tables 110a, ..., the item sequence tables 120a, ..., and the item interrelation table 130 of the new analysis object data. However, if there are items of the data of the objects which are to be unified, whose item IDs are identical, whether they are unified to one item or one of them is modified is inputted and specified separately for each of them by using a terminal.

In the case where the subcommand code is "4", the data deletion process in Step 960 is effected and the item tables 110a, ..., the item sequence table and the item interrelation table of the data of the objects, which are to be deleted, specified by the operands of the CLEAR subcommand.

In the case where the subcommand code is "5", the procedure returns to Step 400 in FIG. 20 (RETURN).

The procedure of the on-line conversation type support system has been described above. Now, the data input procedure by batch will be explained below.

For a new registration, item tables 110a, 110b, ... and item sequence tables 120a, ... of the data of the objects, which are to be newly prepared, are newly prepared by using item data read in from the card reader 12 and then an item interrelation table 130 of the data of the objects, which are to be newly prepared, is formed by using interrelation data read in consecutively. Moreover, the inputted interrelation data are checked so that the situation in direction of the interrelations are consistent with the situation in direction between the sorts of items defined in the correspondence table 140 between the sort of items and the layer number. On the other hand, for an additional registration the procedure is principally identical to those for the item addition (Step 720) of the data correction (Step 700) and for the item interrelation addition (Step 740). In this way, it is possible to display influence schemes for defective works in each process and required quality guarantee schemes for each of the required quality. Thus, since who effects the analysis can know at first glance mutual relations between the required specifications (required quality) and works in the manufacturing and controlling processes, basing on the influence schemes for defective works in each process and the required quality guarantee schemes, it is possible for him to pick-up unsatisfactory points. Moreover, in the case where there are some corrections to be effected in items or interrelations between different items, information in the data file can be corrected by using the AMEND command. Further, basing on the information in the data file after the end of an analysis, it is possible to prepare control tables by using the LIST command and to give work instructions, by which analysis results are reflected in the manufacturing line. Change of work sequence can be easily realized by using the AMEND command and modifying the flow sequence and processes of the work items. In addition, by using the FILE command and by dividing, unifying or copying data concerning the items and the interrelations therebetween for existing analoguous products or products before model change, it is possible to utilize effectively data thus obtained as data for new products and model changed products. Principal advantages of the system according to this invention are as follows.

(i) Since important parts of the manufacturing and controlling processes in view of the quality become clear, it is possible to decrease the defective rate for a product by ameliorating these parts.

(ii) Process amelioration, introduction of new installations, etc. can be promoted for maintaining or further ameliorating the quality.

(iii) Since the relations between each of the manufacturing and controlling processes and the required qualities for a certain product become clear and work instructions can be rapidly and adequately given to the manufacturing processes, quality consciousness of workers is increased.

(iv) Shortening the duration of the reliability for the manufacturing processes and ameliorating the quality can be attempted.

(v) Fluctuations in quality due to changes of works in the manufacturing processes can be reduced.

(vi) When abnormalities are found, countermeasures can be taken rapidly and adequately.

As explained above, according to this invention, since the reliability analysis of the manufacturing and controlling processes can be effectively carried out, it is possible to exclude defectives with high efficiency in the manufacturing and controlling processes and to perform speedy quality control in the manufacturing processes.

What is claimed:

1. A system for analyzing reliability of manufacturing processes, comprising:
   a computer system provided with a data memory device, a central processing device and input/output devices;
   terminals which send/receive information to/from said computer system; and output devices for use at manufacturing sites; whereby said data memory device stores required specifications for each product, works for manufacturing and inspecting processes, information relating to items, such as required specifications, works, control items, etc. and information on mutual relations among different items; works, control items for said works, and required specifications relating to said control items are extracted for each process from information thus stored; quality control schemes for each of the processes are formed on the basis of this extracted information and outputted to said output device for use as manufacturing sites; said outputted schemes are analyzed; in the case where said schemes should be corrected, correction and replacement of each item and mutual relation of said stored information from said terminals are effected an arbitrary number of times; works which influence said required specifications and the control items for said works are extracted; quality control schemes for each of the required specifications are formed on the basis of this extracted information and outputted to said output device for use at manufacturing sites; said schemes are analyzed; in the case where said schemes should be corrected, correction and replacement of each item and mutual relation of said stored information from said termials are effected an arbitrary number of times; and in this manner reliability is analyzed for each process and required specification.

2. A system for analyzing reliability of manufacturing processes according to claim 1, wherein said computer system reads out for each manufacturing and inspecting step, the works, the control items set up for said works, and the required specifications relating to said control items from the data memory and outputs work instructions for the whole or a part of the manufacturing and inspecting processes to said output devices for manufacturing sites.

3. A system for analyzing reliability of manufacturing processes according to claim 1, wherein said terminals arbitrarily input modifications in the sequenc of works in the manufacturing and inspecting processes into said computer system, which outputs in turn work instructions everyday to said output devices for use at the manufacturing sites.

4. A system for analyzing reliability of manufacturing processes according to claim 1, wherein said computer system extracts the relating items in specified domains in the direction from specified items to required specifications or to works in order to intercept said items and to store them in tables.

5. A system for analyzing reliability of manufacturing processes according to claim 4, wherein said computer system rearranges the items stored in said intercepted item table into a plurality of layers, distinguishing required specification obstruction factor, control item and work from each other and arranging them according to the flow sequence of works, at the same time prepares a multi-layer structure scheme, connecting interrelated information representing items, which are interrelated with each other, by using interrelation lines, and outputs the scheme.

6. A system for analyzing reliability of manufacturing processes according to claim 5, wherein said computer system inserts at least one new other layer of items between 2 different layers adjacent to each other, basing on the interrelation between the required specifications and works in the process and memorizes the inserted items in addition to interrelation information basing on the interrelation between item information and the inserted items.

7. A system for analyzing reliability of manufacturing processes according to claim 5, wherein said computer system outputs and displays at least one additional item display frame so that inspection and verification works, required qualities, etc. at least in the multi-layer structure schemes can be identified.

8. A system for analyzing reliability of manufacturing processes according to claim 1, wherein said computer system rearranges the items stored in said data memory into a plurality of layers, distinguishes required specification, obstruction factor, control item and work from each other and arranging them according to the flow sequence of works, at the same time prepares a multi-layer structure scheme, connecting interrelated information representing items, which are interrelated with each other, by using interrelation lines, and outputs the scheme.

* * * * *